(12) United States Patent  
Chen et al.

(10) Patent No.: US 12,519,711 B2  
(45) Date of Patent: Jan. 6, 2026

(54) MASTER/SLAVE NODE DETERMINATION METHOD AND APPARATUS, AND ELECTRONIC DEVICE AND STORAGE MEDIUM

(71) Applicant: SUZHOU METABRAIN INTELLIGENT TECHNOLOGY CO., LTD., Jiangsu (CN)

(72) Inventors: Jiang Chen, Jiangsu (CN); Shu Han, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/878,030

(22) PCT Filed: Oct. 31, 2023

(86) PCT No.: PCT/CN2023/128590  
§ 371 (c)(1),  
(2) Date: Dec. 21, 2024

(87) PCT Pub. No.: WO2024/099182  
PCT Pub. Date: May 16, 2024

(65) Prior Publication Data  
US 2025/0274369 A1    Aug. 28, 2025

(30) Foreign Application Priority Data  
Nov. 10, 2022    (CN) .......................... 202211408144.1

(51) Int. Cl.  
*H04L 43/10*     (2022.01)  
*H04L 41/0853*   (2022.01)  
*H04L 41/12*     (2022.01)

(52) U.S. Cl.  
CPC .......... *H04L 43/10* (2013.01); *H04L 41/0853* (2013.01); *H04L 41/12* (2013.01)

(58) Field of Classification Search  
CPC ..... H04L 43/10; H04L 41/0853; H04L 41/12; G06F 11/0721; G06F 11/079; G06F 11/0724; G06F 11/0793; G06F 9/5072  
See application file for complete search history.

(56) References Cited

U.S. PATENT DOCUMENTS

| | | | |
|---|---|---|---|
| 12,346,751 B2 * | 7/2025 | Liu | ...................... G06F 15/177 |
| 2019/0095293 A1 | 3/2019 | Zhang et al. | |

(Continued)

FOREIGN PATENT DOCUMENTS

| | | |
|---|---|---|
| CN | 109104346 A | 12/2018 |
| CN | 112422320 A | 2/2021 |

(Continued)

*Primary Examiner* — Tonia L Dollinger  
*Assistant Examiner* — Joseph M Cousins  
(74) *Attorney, Agent, or Firm* — IPro, PLLC

(57) ABSTRACT

A method for determining a master-slave node is provided. The method includes: determining a first target node, a second target node, a third target node and a fourth target node from the plurality of storage nodes, where the first target node includes first check data including a first first character and a first last character; generating heartbeat signals and master-disable signals for the target nodes; determining the first target node as a master node when the first first character and the first last character are the same and the first first character and the first last character are the same as a preset value, it is determined that the second target node, the third target node and the fourth target node are not master nodes, the first target node is not a slave node, the first master-disable signal is invalid, and the first heartbeat signal is in a normal state.

20 Claims, 8 Drawing Sheets

(56) References Cited

U.S. PATENT DOCUMENTS

2019/0163573 A1* 5/2019 Chen .................... G06F 11/1438
2020/0084088 A1* 3/2020 Zhu ..................... H04L 41/0659

FOREIGN PATENT DOCUMENTS

| CN | 112866314 A | 5/2021 |
| CN | 112968919 A | 6/2021 |
| CN | 115567395 A | 1/2023 |
| KR | 20040038266 A | 5/2004 |

\* cited by examiner

MASTER/SLAVE NODE DETERMINATION METHOD AND APPARATUS, AND ELECTRONIC DEVICE AND STORAGE MEDIUM

CROSS-REFERENCE TO RELATED APPLICATION

The present disclosure claims the priority of Chinese patent application filed on Nov. 10, 2022 before the CNIPA, China National Intellectual Property Administration with the application number of 202211408144.1, and the title of "METHOD AND APPARATUS FOR DETERMINING MASTER-SLAVE NODE, ELECTRONIC DEVICE AND STORAGE MEDIUM", which is incorporated herein in its entirety by reference.

FIELD

The present disclosure relates to the field of master-slave node determination technologies, and more particularly to a method for determining a master-slave node, an apparatus for determining a master-slave node, an electronic device and a non-transitory computer readable storage medium.

BACKGROUND

A multi-node server, as its name implies, is a server with a plurality of nodes. The multi-node server is composed of the plurality of nodes and a management unit that manages a whole apparatus. The multi-node server can reduce the load of a server, can be distributed and applied flexibly, and can also be used as a virtual disk server. The multi-node server is also very easy to manage, each node of the multi-node server can be managed independently, and a unified management mode can be realized through a chassis management module, thereby possessing better versatility and ease of use. The multi-node server also has modular deployment, each node can be flexibly matched and deployed in a mixed manner, and a modular front window can be matched with different types of node front windows according to user needs. Flexible expansion features can realize almost customized product configuration. The multi-node server can accommodate various workloads and computing nodes, and can be matched with different blocks of high-capacity hard disks. The multi-node server can perfectly support both multi-network expansion and high input/output operations per second (IOPS).

In practical applications, the multi-node server is used for data storage. Although the multi-node server has a plurality of storage nodes, contents stored on each of the plurality of storage nodes are different, if the node fails, the data will be lost. In order to ensure the high availability of these data, it is necessary for each node (a host) to make backups, which are called slave nodes. After having master nodes and the slave nodes, it is possible to realize extended functions such as read/write splitting (master shard writing and replica reading). Therefore, how to determine a master-slave node from the plurality of storage nodes of the multi-node server has become a technical problem that a person skilled in the art needs to overcome.

SUMMARY

Embodiments of the present disclosure provide a method and an apparatus for determining a master-slave node, an electronic device and a non-transitory computer readable storage medium, so as to solve the problem of how to determine a master-slave node from the plurality of storage nodes of the multi-node server.

The embodiments of the present disclosure disclose a method for determining a master-slave node, applied to a multi-node server, where the multi-node server includes a plurality of storage nodes, and the method includes:
  determining a first target node, a second target node, a third target node and a fourth target node from the plurality of storage nodes, where the first target node includes first check data, which includes a first first character and a first last character;
  generating a first heartbeat signal and a first master-disable signal for the first target node;
  generating a second heartbeat signal and a second master-disable signal for the second target node;
  generating a third heartbeat signal and a third master-disable signal for the third target node;
  generating a fourth heartbeat signal and a fourth master-disable signal for the fourth target node; and
  determining the first target node as a master node in response to the first first character and the first last character being the same and the first first character and the first last character being the same as a preset value, determining that there is no master node in the second target node, the third target node and the fourth target node based on the second heartbeat signal, the second master-disable signal, the third heartbeat signal, the third master-disable signal, the fourth heartbeat signal and the fourth master-disable signal, the first target node being not a slave node, the first master-disable signal being invalid, and the first heartbeat signal being in a normal state.

In some embodiments of the present disclosure, the method further includes:
  determining the first target node as the master node in response to the first target node being the slave node, the first heartbeat signal being in the normal state, the first master-disable signal being invalid, the second master-disable signal being invalid, and the third master-disable signal being invalid;
  determining the first target node as the slave node in response to the first target node being the slave node, the first heartbeat signal being in an abnormal state, and/or the first master-disable signal being valid, and/or the second master-disable signal being valid, and/or the third master-disable signal being valid;
  determining the first target node as the slave node in response to the first target node being not the slave node, the first heartbeat signal being in the abnormal state, and/or the first master-disable signal being valid; and
  determining the first target node as the slave node in response to the first first character and the first last character being different, and/or the first first character and the first last character being different from the preset value.

In some embodiments of the present disclosure, the method further includes:
  determining whether there is a master node in the first target node, the third target node and the fourth target node based on the first heartbeat signal, the first master-disable signal, the third heartbeat signal, the third master-disable signal, the fourth heartbeat signal and the fourth master-disable signal in response to the first first character and the first last character being the same, and the first first character and the first last character being the same as the preset value;

determining the second target node as a master node in response to determining that there is no master node in the first target node, the third target node and the fourth target node, the second target node being not a slave node, the second heartbeat signal being in the normal state, and the second master-disable signal being invalid; and determining the second target node as the master node in response to determining that there is no master node in the first target node, the third target node and the fourth target node, the second target node being the slave node, the second heartbeat signal being in the normal state, the second master-disable signal being invalid, the third master-disable signal being invalid, and the first heartbeat signal being in an abnormal state or the first master-disable signal being valid.

In some embodiments of the present disclosure, the method further includes:

determining the second target node as the slave node in response to determining that there is the master node in the first target node, the third target node and the fourth target node;

determining the second target node as the slave node in response to determining that there is no master node in the first target node, the third target node and the fourth target node, the second target node being the slave node, the second heartbeat signal being in the abnormal state, and/or the second master-disable signal being valid, and/or the third master-disable signal being valid, and/or the first heartbeat signal being in the normal state, and/or the first master-disable signal being invalid; and determining the second target node as the slave node in response to determining that there is no master node in the first target node, the third target node and the fourth target node, the second target node being not the slave node, the second heartbeat signal being in the abnormal state, and/or the second master-disable signal being valid.

In some embodiments of the present disclosure, the second target node includes second check data, which includes a second first character and a second last character, and the method further includes:

determining whether there is a master node in the third target node and the fourth target node based on the third heartbeat signal, the third master-disable signal, the fourth heartbeat signal and the fourth master-disable signal in response to the first first character and the first last character being different and/or the first first character and the first last character being different from the preset value, and the second first character and the second last character being the same and the second first character and the second last character being the same as the preset value;

determining the second target node as the master node in response to determining that there is no master node in the third target node and the fourth target node, the second target node being not the slave node, the second heartbeat signal being in the normal state and the second master-disable signal being invalid; and determining the second target node as the master node in response to determining that there is no master node in the third target node and the fourth target node, the second target node being the slave node, the second heartbeat signal being in the normal state, the second master-disable signal being invalid and the third master-disable signal being invalid.

In some embodiments of the present disclosure, the method further includes:

determining the second target node as the slave node in response to the first first character and the first last character being different and/or the first first character and the first last character being different from the preset value, and the second first character and the second last character being different and/or the second first character and the second last character being different from the preset value; and determining the second target node as the slave node in response to the first first character and the first last character being different and/or the first first character and the first last character being different from the preset value, the second first character and the second last character being the same and the second first character and the second last character being the same as the preset value, and determining that there is the master node in the third target node and the fourth target node.

In some embodiments of the present disclosure, the method further includes:

determining the second target node as the slave node in response to the second target node being not the slave node, the second heartbeat signal being in the abnormal state, and/or the second master-disable signal being valid; and determining the second target node as the slave node in response to the second target node being the slave node, the second heartbeat signal being in the abnormal state, and/or the second master-disable signal being valid, and/or the third master-disable signal being valid.

In some embodiments of the present disclosure, the method further includes:

determining whether there is a master node in the first target node, the second target node and the fourth target node based on the first heartbeat signal, the first master-disable signal, the second heartbeat signal, the second master-disable signal, the fourth heartbeat signal and the fourth master-disable signal in response to the first first character and the first last character being the same and the first first character and the first last character being the same as the preset value, or the second first character and the second last character being the same and the second first character and the second last character being the same as the preset value;

determining the third target node as a master node in response to determining that there is no master node in the first target node, the second target node and the fourth target node, the third target node being not a slave node, the third heartbeat signal being in the normal state, and the third master-disable signal being invalid;

determining the third target node as the master node in response to determining that there is no master node in the first target node, the second target node and the fourth target node, the third target node being the slave node, the second master-disable signal being valid, the third heartbeat signal being in the normal state, and the third master-disable signal being invalid; and determining the third target node as the master node in response to determining that there is no master node in the first target node, the second target node and the fourth target node, the third target node being the slave node, the second master-disable signal being invalid, the third heartbeat signal being in the normal state, the third master-disable signal being invalid, the first heartbeat signal being in the abnormal state or the first master-disable signal being valid, and the second heartbeat signal being in the abnormal state.

In some embodiments of the present disclosure, the method further includes:

determining the third target node as the slave node in response to determining that there is the master node in the first target node, the second target node and the fourth target node;

determining the third target node as the slave node in response to determining that there is no master node in the first target node, the second target node and the fourth target node, the third target node being not the slave node, the third heartbeat signal being in the abnormal state, and/or the third master-disable signal being valid;

determining the third target node as the slave node in response to determining that there is no master node in the first target node, the second target node and the fourth target node, the third target node being the slave node, the second master-disable signal being valid, the third heartbeat signal being in the abnormal state, and/or the third master-disable signal being valid; and determining the third target node as the slave node in response to determining that there is no master node in the first target node, the second target node and the fourth target node, the third target node being the slave node, the second master-disable signal being invalid, the third heartbeat signal being in the abnormal state, and/or the third master-disable signal being valid, and/or the first heartbeat signal being in the normal state, and/or the first master-disable signal being invalid, and/or the second heartbeat signal being in the normal state.

In some embodiments of the present disclosure, the third target node includes third check data, which includes a third first character and a third last character, and the method further includes:

determining whether the fourth target node is a master node based on the fourth heartbeat signal and the fourth master-disable signal in response to the first first character and the first last character being different and/or the first first character and the first last character being different from the preset value, the second first character and the second last character being different and/or the second first character and the second last character being different from the preset value, and the third first character and the third last character being the same and the third first character and the third last character being the same as the preset value; and determining the third target node as the master node in response to determining that the fourth target node is not the master node, the third heartbeat signal is in the normal state, and the third master-disable signal is invalid.

In some embodiments of the present disclosure, the method further includes:

determining the third target node as the slave node in response to the first first character and the first last character being different and/or the first first character and the first last character being different from the preset value, the second first character and the second last character being different and/or the second first character and the second last character being different from the preset value, and the third first character and the third last character being different and/or the third first character and the third last character being different from the preset value;

determining the third target node as the slave node in response to the first first character and the first last character being different and/or the first first character and the first last character being different from the preset value, the second first character and the second last character being different and/or the second first character and the second last character being different from the preset value, the third first character and the third last character being the same and the third first character and the third last character being the same as the preset value, and determining that the fourth target node is the master node; and determining the third target node as the slave node in response to the first first character and the first last character being different and/or the first first character and the first last character being different from the preset value, the second first character and the second last character being different and/or the second first character and the second last character being different from the preset value, the third first character and the third last character being the same and the third first character and the third last character being the same as the preset value, determining that the fourth target node is not the master node, and the third heartbeat signal being in the abnormal state and/or the third master-disable signal being valid.

In some embodiments of the present disclosure, the method further includes:

determining whether any of the first target node, the second target node and the third target node is a master node based on the first heartbeat signal, the first master-disable signal, the second heartbeat signal, the second master-disable signal, the third heartbeat signal and the third master-disable signal in response to the first first character and the first last character being the same and the first first character and the first last character being the same as the preset value, or the second first character and the second last character being the same and the second first character and the second last character being the same as the preset value, or the third first character and the third last character being the same and the third first character and the third last character being the same as the preset value;

determining the fourth target node as the master node in response to determining that there is no master node in the first target node, the second target node and the third target node, the fourth target node being not the slave node, the fourth heartbeat signal being in the normal state, and the fourth master-disable signal being invalid;

determining the fourth target node as the master node in response to determining that there is no master node in the first target node, the second target node and the third target node, the fourth target node being the slave node, the second master-disable signal being valid, the fourth heartbeat signal being in the normal state, the fourth master-disable signal being invalid, and the third heartbeat signal being in the abnormal state or the third master-disable signal being valid;

determining the fourth target node as the master node in response to determining that there is no master node in the first target node, the second target node and the third target node, the fourth target node being the slave node, the second master-disable signal being invalid, the third master-disable signal being valid, the fourth heartbeat signal being in the normal state, and the fourth master-disable signal being invalid; and determining the fourth target node as the master node in response to determining that there is no master node in the first target node, the second target node and the third target node, the fourth target node being the slave node, the second master-disable signal being invalid, the third master-disable signal being invalid, the first heartbeat signal being in the abnormal state or the first master-disable signal being valid, the second heartbeat signal being in the abnormal state, and the third heartbeat signal being in the abnormal state.

In some embodiments of the present disclosure, the method further includes:

determining the fourth target node as a slave node in response to determining that there is no master node in the first target node, the second target node and the third target node, the fourth target node being not the slave node, and the fourth heartbeat signal being in the abnormal state, and/or the fourth master-disable signal being invalid;

determining the fourth target node as the slave node in response to determining that there is no master node in the first target node, the second target node and the third target node, the fourth target node being the slave node, the second master-disable signal being valid, the fourth heartbeat signal being in the abnormal state, and/or the fourth master-disable signal being valid, the third heartbeat signal being in the abnormal state, and/or the third master-disable signal being valid;

determining the fourth target node as the slave node in response to determining that there is no master node in the first target node, the second target node and the third target node, the fourth target node being the slave node, the second master-disable signal being invalid, the third master-disable signal being valid, the fourth heartbeat signal being in the abnormal state, and/or the fourth master-disable signal being valid;

determining the fourth target node as the slave node in response to determining that there is no master node in the first target node, the second target node and the third target node, the fourth target node being the slave node, the second master-disable signal being invalid, the third master-disable signal being invalid, the first heartbeat signal being in the normal state, and/or the first master-disable signal being invalid, and/or the second heartbeat signal being in the normal state, and/or the third heartbeat signal being in the normal state; and determining the fourth target node as the slave node in response to determining that there is the master node in the first target node, the second target node and the third target node.

In some embodiments of the present disclosure, the fourth target node includes fourth check data, which includes a fourth first character and a fourth last character, and the method further includes:

determining the fourth target node as the master node in response to the first first character and the first last character being different and/or the first first character and the first last character being different from the preset value, the second first character and the second last character being different and/or the second first character and the second last character being different from the preset value, the third first character and the third last character being different and/or the third first character and the third last character being different from the preset value, the fourth first character and the fourth last character being the same and the fourth first character and the fourth last character being the same as the preset value, the fourth heartbeat signal being in the normal state, and the fourth master-disable signal being invalid.

In some embodiments of the present disclosure, the method further includes:

determining the fourth target node as the slave node in response to the fourth first character and the fourth last character being different, and/or the fourth first character and the fourth last character being different from the preset value; and determining the fourth target node as the slave node in response to the fourth first character and the fourth last character being the same and the fourth first character and the fourth last character being the same as the preset value, the fourth heartbeat signal being in the abnormal state, and/or the fourth master signal being valid.

In some embodiments of the present disclosure, the first target node, the second target node, the third target node and the fourth target node respectively have corresponding baseboard management controllers (BMCs), which are configured to generate the first heartbeat signal and the first master-disable signal for the first target node, the second heartbeat signal and the second master-disable signal for the second target node, the third heartbeat signal and the third master-disable signal for the third target node, and the fourth heartbeat signal and the fourth master-disable signal for the fourth target node.

In some embodiments of the present disclosure, the multi-node server includes a complex programmable logic device (CPLD), which is configured to determine the first target node, the second target node, the third target node and the fourth target node as master nodes or slave nodes.

The embodiments of the present disclosure further disclose an apparatus for determining a master-slave node, applied to a multi-node server, where the multi-node server includes a plurality of storage nodes, and the apparatus includes:

a target node determination module configured to determine a first target node, a second target node, a third target node and a fourth target node from the plurality of storage nodes, where the first target node includes first check data, which includes a first first character and a first last character;

a first signal generation module configured to generate a first heartbeat signal and a first master-disable signal for the first target node;

a second signal generation module configured to generate a second heartbeat signal and a second master-disable signal for the second target node;

a third signal generation module configured to generate a third heartbeat signal and a third master-disable signal for the third target node;

a fourth signal generation module configured to generate a fourth heartbeat signal and a fourth master-disable signal for the fourth target node; and a master node determination module configured to determine the first target node as a master node in response to the first first character and the first last character being the same and the first first character and the first last character being the same as a preset value, determining that there is no master node in the second target node, the third target node and the fourth target node based on the second heartbeat signal, the second master-disable signal, the third heartbeat signal, the third master-disable signal, the fourth heartbeat signal and the fourth master-disable signal, the first target node being not a slave node, the first master-disable signal being invalid, and the first heartbeat signal being in a normal state.

In some embodiments of the present disclosure, the apparatus further includes:
  a first module configured to determine the first target node as the master node in response to the first target node being the slave node, the first heartbeat signal being in the normal state, the first master-disable signal being invalid, the second master-disable signal being invalid, and the third master-disable signal being invalid,
  a second module configured to determine the first target node as the slave node in response to the first target node being the slave node, the first heartbeat signal being in an abnormal state, and/or the first master-disable signal being valid, and/or the second master-disable signal being valid, and/or the third master-disable signal being valid;
  a third module configured to determine the first target node as the slave node in response to the first target node being not the slave node, the first heartbeat signal being in the abnormal state, and/or the first master-disable signal being valid; and
  a fourth module configured to determine the first target node as the slave node in response to the first first character and the first last character being different, and/or the first first character and the first last character being different from the preset value.

In some embodiments of the present disclosure, the apparatus further includes:
  a fifth module configured to determine whether there is a master node in the first target node, the third target node and the fourth target node based on the first heartbeat signal, the first master-disable signal, the third heartbeat signal, the third master-disable signal, the fourth heartbeat signal and the fourth master-disable signal in response to the first first character and the first last character being the same, and the first first character and the first last character being the same as the preset value;
  a sixth module configured to determine the second target node as a master node in response to determining that there is no master node in the first target node, the third target node and the fourth target node, the second target node being not a slave node, the second heartbeat signal being in the normal state, and the second master-disable signal being invalid; and
  a seventh module configured to determine the second target node as the master node in response to determining that there is no master node in the first target node, the third target node and the fourth target node, the second target node being the slave node, the second heartbeat signal being in the normal state, the second master-disable signal being invalid, the third master-disable signal being invalid, and the first heartbeat signal being in an abnormal state or the first master-disable signal being valid.

In some embodiments of the present disclosure, the apparatus further includes:
  an eighth module configured to determine the second target node as the slave node in response to determining that there is the master node in the first target node, the third target node and the fourth target node;
  a ninth module configured to determine the second target node as the slave node in response to determining that there is no master node in the first target node, the third target node and the fourth target node, the second target node being the slave node, the second heartbeat signal being in the abnormal state, and/or the second master-disable signal being valid, and/or the third master-disable signal being valid, and/or the first heartbeat signal being in the normal state, and/or the first master-disable signal being invalid; and
  a tenth module configured to determine the second target node as the slave node in response to determining that there is no master node in the first target node, the third target node and the fourth target node, the second target node being not the slave node, the second heartbeat signal being in the abnormal state, and/or the second master-disable signal being valid.

In some embodiments of the present disclosure, the second target node includes second check data, which includes a second first character and a second last character, and the apparatus further includes:
  an eleventh module configured to determine whether there is a master node in the third target node and the fourth target node based on the third heartbeat signal, the third master-disable signal, the fourth heartbeat signal and the fourth master-disable signal in response to the first first character and the first last character being different and/or the first first character and the first last character being different from the preset value, and the second first character and the second last character being the same and the second first character and the second last character being the same as the preset value;
  a twelfth module configured to determine the second target node as the master node in response to determining that there is no master node in the third target node and the fourth target node, the second target node being not the slave node, the second heartbeat signal being in the normal state and the second master-disable signal being invalid; and
  a thirteenth module configured to determine the second target node as the master node in response to determining that there is no master node in the third target node and the fourth target node, the second target node being the slave node, the second heartbeat signal being in the normal state, the second master-disable signal being invalid and the third master-disable signal being invalid.

In some embodiments of the present disclosure, the apparatus further includes:
  a fourteenth module configured to determine the second target node as the slave node in response to the first first character and the first last character being different and/or the first first character and the first last character being different from the preset value, and the second first character and the second last character being different and/or the second first character and the second last character being different from the preset value; and
  a fifteenth module configured to determine the second target node as the slave node in response to the first first character and the first last character being different and/or the first first character and the first last character being different from the preset value, the second first character and the second last character being the same and the second first character and the second last character being the same as the preset value, and determining that there is the master node in the third target node and the fourth target node.

In some embodiments of the present disclosure, the apparatus further includes:
- a sixteenth module configured to determine the second target node as the slave node in response to the second target node being not the slave node, the second heartbeat signal being in the abnormal state, and/or the second master-disable signal being valid; and
- a seventeenth module configured to determine the second target node as the slave node in response to the second target node being the slave node, the second heartbeat signal being in the abnormal state, and/or the second master-disable signal being valid, and/or the third master-disable signal being valid.

In some embodiments of the present disclosure, the apparatus further includes:
- an eighteenth module configured to determine whether there is a master node in the first target node, the second target node and the fourth target node based on the first heartbeat signal, the first master-disable signal, the second heartbeat signal, the second master-disable signal, the fourth heartbeat signal and the fourth master-disable signal in response to the first first character and the first last character being the same and the first first character and the first last character being the same as the preset value, or the second first character and the second last character being the same and the second first character and the second last character being the same as the preset value;
- a nineteenth module configured to determine the third target node as a master node in response to determining that there is no master node in the first target node, the second target node and the fourth target node, the third target node being not a slave node, the third heartbeat signal being in the normal state, and the third master-disable signal being invalid;
- a twentieth module configured to determine the third target node as the master node in response to determining that there is no master node in the first target node, the second target node and the fourth target node, the third target node being the slave node, the second master-disable signal being valid, the third heartbeat signal being in the normal state, and the third master-disable signal being invalid; and
- a twenty-first module configured to determine the third target node as the master node in response to determining that there is no master node in the first target node, the second target node and the fourth target node, the third target node being the slave node, the second master-disable signal being invalid, the third heartbeat signal being in the normal state, the third master-disable signal being invalid, the first heartbeat signal being in the abnormal state or the first master-disable signal being valid, and the second heartbeat signal being in the abnormal state.

In some embodiments of the present disclosure, the apparatus further includes:
- a twenty-second module configured to determine the third target node as the slave node in response to determining that there is the master node in the first target node, the second target node and the fourth target node;
- a twenty-third module configured to determine the third target node as the slave node in response to determining that there is no master node in the first target node, the second target node and the fourth target node, the third target node being not the slave node, the third heartbeat signal being in the abnormal state, and/or the third master-disable signal being valid;
- a twenty-fourth module configured to determine the third target node as the slave node in response to determining that there is no master node in the first target node, the second target node and the fourth target node, the third target node being the slave node, the second master-disable signal being valid, the third heartbeat signal being in the abnormal state, and/or the third master-disable signal being valid; and
- a twenty-fifth module configured to determine the third target node as the slave node in response to determining that there is no master node in the first target node, the second target node and the fourth target node, the third target node being the slave node, the second master-disable signal being invalid, the third heartbeat signal being in the abnormal state, and/or the third master-disable signal being valid, and/or the first heartbeat signal being in the normal state, and/or the first master-disable signal being invalid, and/or the second heartbeat signal being in the normal state.

In some embodiments of the present disclosure, the third target node includes third check data, which includes a third first character and a third last character, and the apparatus further includes:
- a twenty-sixth module configured to determine whether the fourth target node is a master node based on the fourth heartbeat signal and the fourth master-disable signal in response to the first first character and the first last character being different and/or the first first character and the first last character being different from the preset value, the second first character and the second last character being different and/or the second first character and the second last character being different from the preset value, and the third first character and the third last character being the same and the third first character and the third last character being the same as the preset value; and
- a twenty-seventh module configured to determine the third target node as the master node in response to determining that the fourth target node is not the master node, the third heartbeat signal is in the normal state, and the third master-disable signal is invalid.

In some embodiments of the present disclosure, the apparatus further includes:
- a twenty-eighth module configured to determine the third target node as the slave node in response to the first first character and the first last character being different and/or the first first character and the first last character being different from the preset value, the second first character and the second last character being different and/or the second first character and the second last character being different from the preset value, and the third first character and the third last character being different and/or the third first character and the third last character being different from the preset value;
- a twenty-ninth module configured to determine the third target node as the slave node in response to the first first character and the first last character being different and/or the first first character and the first last character being different from the preset value, the second first character and the second last character being different and/or the second first character and the second last character being different from the preset value, the third first character and the third last character being the same and the third first character and the third last character being the same as the preset value, and determining that the fourth target node is the master node; and a thirtieth module configured to determine the third target node as the slave node in response to the first first character and the first last character being different and/or the first first character and the first last character being different from the preset value, the second first character and the second last character being different and/or the second first character and the second last character being different from the preset value, the third first character and the third last character being the same and the third first character and the third last character being the same as the preset value, determining that the fourth target node is not the master node, and the third heartbeat signal being in the abnormal state and/or the third master-disable signal being valid.

In some embodiments of the present disclosure, the apparatus further includes:

a thirty-first module configured to determine whether any of the first target node, the second target node and the third target node is a master node based on the first heartbeat signal, the first master-disable signal, the second heartbeat signal, the second master-disable signal, the third heartbeat signal and the third master-disable signal in response to the first first character and the first last character being the same and the first first character and the first last character being the same as the preset value, or the second first character and the second last character being the same and the second first character and the second last character being the same as the preset value, or the third first character and the third last character being the same and the third first character and the third last character being the same as the preset value;

a thirty-second module configured to determine the fourth target node as the master node in response to determining that there is no master node in the first target node, the second target node and the third target node, the fourth target node being not the slave node, the fourth heartbeat signal being in the normal state, and the fourth master-disable signal being invalid;

a thirty-third module configured to determine the fourth target node as the master node in response to determining that there is no master node in the first target node, the second target node and the third target node, the fourth target node being the slave node, the second master-disable signal being valid, the fourth heartbeat signal being in the normal state, the fourth master-disable signal being invalid, and the third heartbeat signal being in the abnormal state or the third master-disable signal being valid;

a thirty-fourth module configured to determine the fourth target node as the master node in response to determining that there is no master node in the first target node, the second target node and the third target node, the fourth target node being the slave node, the second master-disable signal being invalid, the third master-disable signal being valid, the fourth heartbeat signal being in the normal state, and the fourth master-disable signal being invalid; and a thirty-fifth module configured to determine the fourth target node as the master node in response to determining that there is no master node in the first target node, the second target node and the third target node, the fourth target node being the slave node, the second master-disable signal being invalid, the third master-disable signal being invalid, the first heartbeat signal being in the abnormal state or the first master-disable signal being valid, the second heartbeat signal being in the abnormal state, and the third heartbeat signal being in the abnormal state.

In some embodiments of the present disclosure, the apparatus further includes:

a thirty-sixth module configured to determine the fourth target node as a slave node in response to determining that there is no master node in the first target node, the second target node and the third target node, the fourth target node being not the slave node, and the fourth heartbeat signal being in the abnormal state, and/or the fourth master-disable signal being invalid;

a thirty-seventh module configured to determine the fourth target node as the slave node in response to determining that there is no master node in the first target node, the second target node and the third target node, the fourth target node being the slave node, the second master-disable signal being valid, the fourth heartbeat signal being in the abnormal state, and/or the fourth master-disable signal being valid, the third heartbeat signal being in the abnormal state, and/or the third master-disable signal being valid;

a thirty-eighth module configured to determine the fourth target node as the slave node in response to determining that there is no master node in the first target node, the second target node and the third target node, the fourth target node being the slave node, the second master-disable signal being invalid, the third master-disable signal being valid, the fourth heartbeat signal being in the abnormal state, and/or the fourth master-disable signal being valid;

a thirty-ninth module configured to determine the fourth target node as the slave node in response to determining that there is no master node in the first target node, the second target node and the third target node, the fourth target node being the slave node, the second master-disable signal being invalid, the third master-disable signal being invalid, the first heartbeat signal being in the normal state, and/or the first master-disable signal being invalid, and/or the second heartbeat signal being in the normal state, and/or the third heartbeat signal being in the normal state; and a fortieth module configured to determine the fourth target node as the slave node in response to determining that there is the master node in the first target node, the second target node and the third target node.

In some embodiments of the present disclosure, the fourth target node includes fourth check data, which includes a fourth first character and a fourth last character, and the apparatus further includes:

a forty-first module configured to determine the fourth target node as the master node in response to the first first character and the first last character being different and/or the first first character and the first last character being different from the preset value, the second first character and the second last character being different and/or the second first character and the second last character being different from the preset value, the third first character and the third last character being different and/or the third first character and the third last character being different from the preset value, the fourth first character and the fourth last character being the same and the fourth first character and the fourth last character being the same as the preset value, the fourth heartbeat signal being in the normal state, and the fourth master-disable signal being invalid.

In some embodiments of the present disclosure, the apparatus further includes:
- a forty-second module configured to determine the fourth target node as the slave node in response to the fourth first character and the fourth last character being different, and/or the fourth first character and the fourth last character being different from the preset value; and
- a forty-third module configured to determine the fourth target node as the slave node in response to the fourth first character and the fourth last character being the same and the fourth first character and the fourth last character being the same as the preset value, the fourth heartbeat signal being in the abnormal state, and/or the fourth master signal being valid.

In some embodiments of the present disclosure, the first target node, the second target node, the third target node and the fourth target node respectively have corresponding baseboard management controllers (BMCs), which are configured to generate the first heartbeat signal and the first master-disable signal for the first target node, the second heartbeat signal and the second master-disable signal for the second target node, the third heartbeat signal and the third master-disable signal for the third target node, and the fourth heartbeat signal and the fourth master-disable signal for the fourth target node.

In some embodiments of the present disclosure, the multi-node server includes a complex programmable logic device (CPLD), which is configured to determine the first target node, the second target node, the third target node and the fourth target node as master nodes or slave nodes.

The embodiments of the present disclosure further disclose an electronic device, including a processor, a communication interface, a memory and a communication bus, where the processor, the communication interface and the memory communicate with each other via the communication bus;

the memory is configured to store a computer program; and the processor is configured to implement the method according to the embodiments of the present disclosure when executing the computer program stored on the memory.

The embodiments of the present disclosure further disclose a non-transitory computer readable storage medium having stored thereon instructions which, when executed by one or more processors, cause the processors to perform the method described in the embodiments of the present disclosure.

The embodiments of the present disclosure include the following advantages: by determining the first target node, the second target node, the third target node and the fourth target node from the plurality of storage nodes; generating heartbeat signals and master-disable signals for the target nodes; and determining the first target node as the master node in response to the first first character and the first last character of the check data being the same and the first first character and the first last character being the same as the preset value, determining that the second target node, the third target node and the fourth target node are not master nodes based on the second heartbeat signal, the second master-disable signal, the third heartbeat signal, the third master-disable signal, the fourth heartbeat signal and the fourth master-disable signal, the first target node being not the slave node and the first heartbeat signal being in the normal state, the determination of the master node is realized.

DETAILED DESCRIPTION

In order to make the objectives, features, and advantages of the present disclosure more obvious and easy to understand, the present disclosure will be described in further detail below with reference to the accompanying drawings and specific embodiments.

Figure 1:
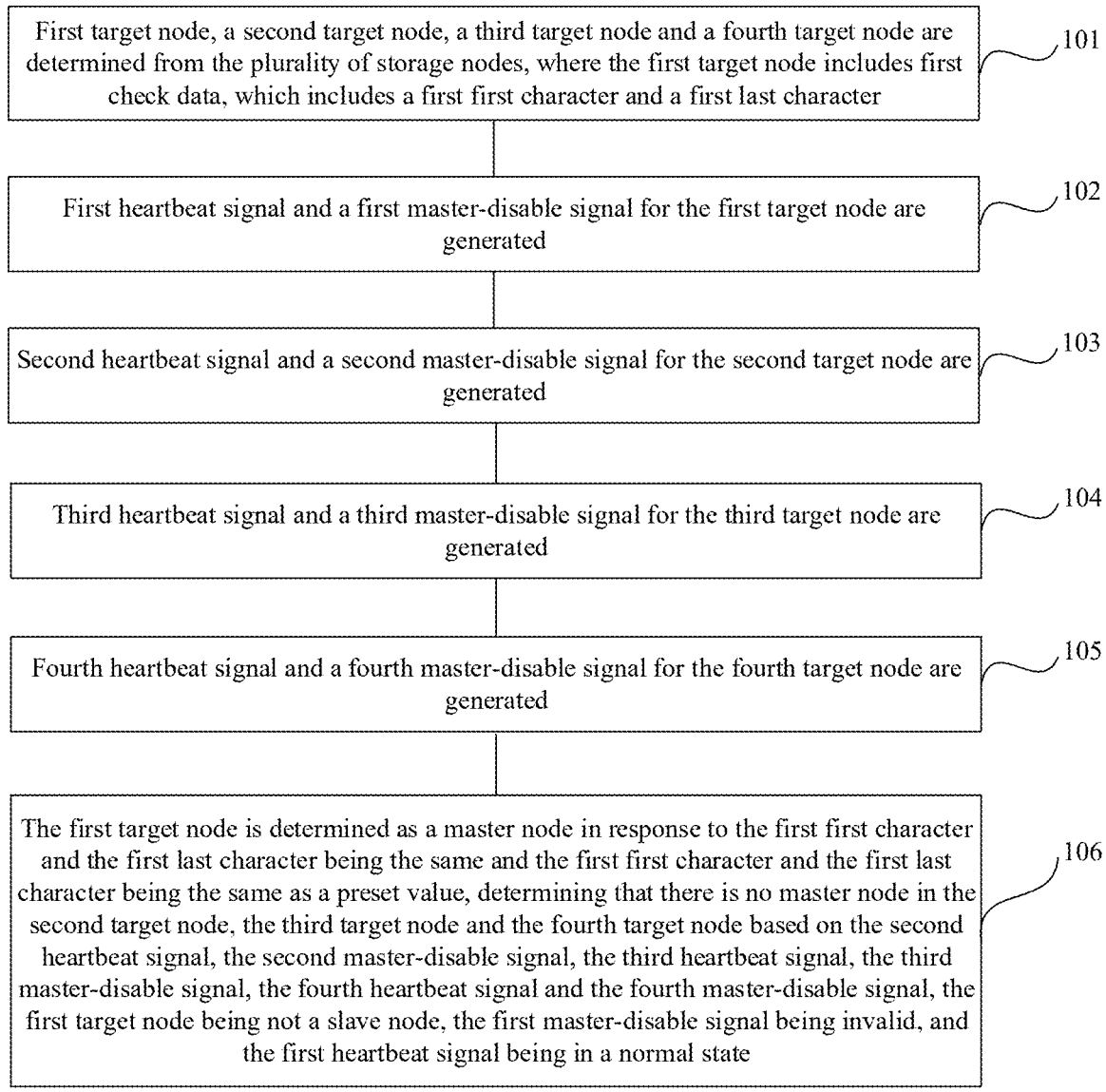
FIG. 1 is a flowchart of steps of a method for determining a master-slave node provided in an embodiment of the present disclosure.

Referring to FIG. 1, FIG. 1 is a flowchart of steps of a method for determining a master-slave node provided in an embodiment of the present disclosure. The method can include following steps:

step 101, a first target node, a second target node, a third target node and a fourth target node are determined from the plurality of storage nodes, where the first target node includes first check data, which includes a first first character and a first last character;

step 102, a first heartbeat signal and a first master-disable signal for the first target node are generated;

step 103, a second heartbeat signal and a second master-disable signal for the second target node are generated;

step 104, a third heartbeat signal and a third master-disable signal for the third target node are generated;

step 105, a fourth heartbeat signal and a fourth master-disable signal for the fourth target node are generated; and step 106, the first target node is determined as a master node in response to the first first character and the first last character being the same and the first first character and the first last character being the same as a preset value, determining that there is no master node in the second target node, the third target node and the fourth target node based on the second heartbeat signal, the second master-disable signal, the third heartbeat signal, the third master-disable signal, the fourth heartbeat signal and the fourth master-disable signal, the first target node being not a slave node, the first master-disable signal being invalid, and the first heartbeat signal being in a normal state.

Figure 2:
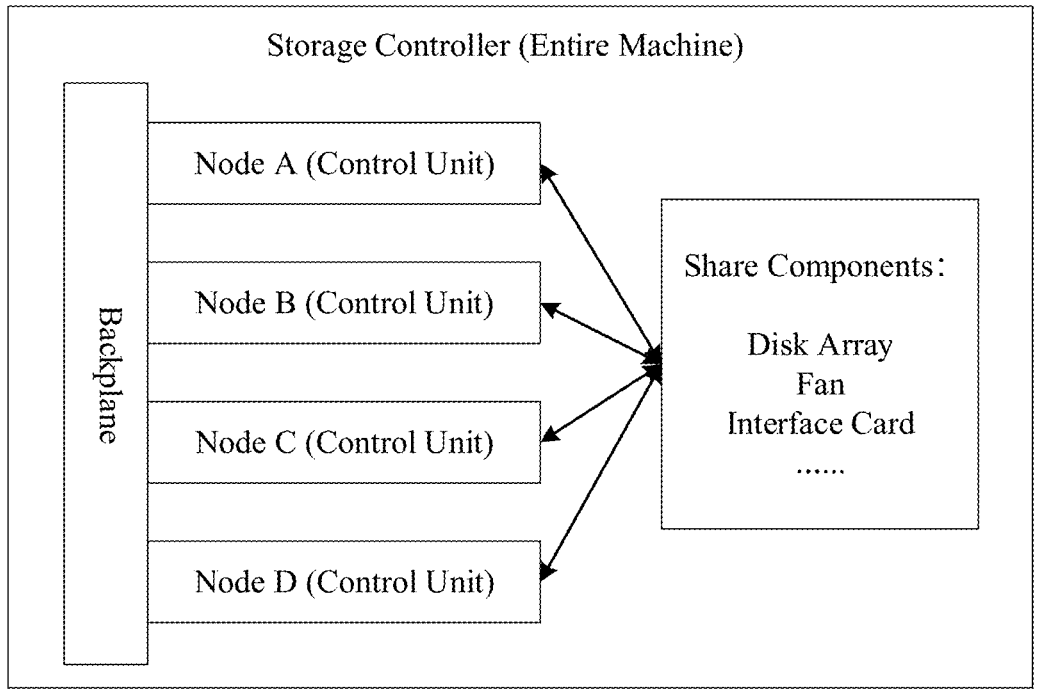
FIG. 2 is a schematic structural diagram of a storage controller provided in an embodiment of the present disclosure.

In specific implementation, the present disclosure can be applied to a multi-node server, which can include a storage controller. Referring to FIG. 2, FIG. 2 is a schematic structural diagram of a storage controller provided in an embodiment of the present disclosure. The storage controller can include four nodes, and each of the four nodes is interconnected with a backplane inside the storage controller. In addition to each node (a control unit), the storage controller also includes a plurality of share components, for example, a disk array, a fan, a power supply unit (PSU), an interface card, and the like.

In some embodiments of the present disclosure, each node of the storage controller may be completely identical in hardware design. Each node includes a complex programmable logic device (CPLD) module, which is responsible for the internal control of the node, and a baseboard management controller (BMC), which is responsible for the internal hardware management of the node.

BMC represents a baseboard management controller, which is a controller used for remote management of servers.

CPLD (Complex Programmable Logic Device) is the abbreviation of complex PLD, which is a more complex logic element than a PLD. The CPLD is a digital integrated circuit that allows users to construct logic functions according to their own needs. The basic design method of the CPLD is to generate corresponding target files by means of an integrated development software platform, schematic diagrams, hardware description languages and other methods, and transmit codes to target chips through download cables ("in system" programming) to realize a designed digital system.

Figure 3:
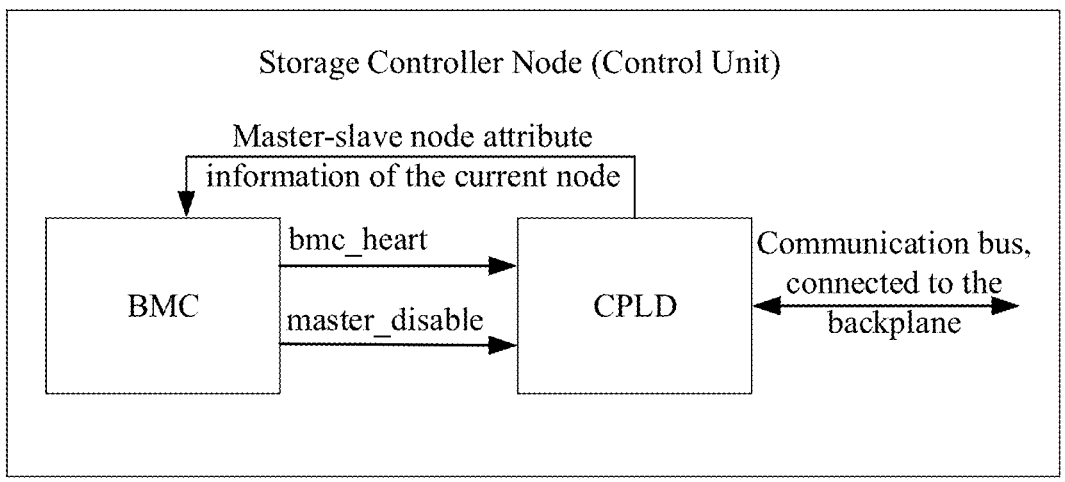
FIG. 3 is a schematic structural diagram of a storage controller node provided in an embodiment of the present disclosure.

Master-slave node attributes of each node (the control unit) inside the storage controller is determined by the CPLD inside each node. For example, in any node, there are three interface signals between the CPLD and the BMC. Referring to FIG. 3, FIG. 3 is a schematic structural diagram of a storage controller node provided in an embodiment of the present disclosure. The CPLD and the BMC can realize data interaction through the interface signals. In the embodiments of the present disclosure, the first target node, the second target node, the third target node and the fourth target node can be determined from the plurality of storage nodes for targets; and in some embodiments of the present disclosure, the BMC can be used to generate the first heartbeat signal and the first master-disable signal for the first target node, the second heartbeat signal and the second master-disable signal for the second target node, the third heartbeat signal and the third master-disable signal for the third target node, and the fourth heartbeat signal and the fourth master-disable signal for the fourth target node; and after determining, by the CPLD, the first target node, the second target node, the third target node and the fourth target node as master nodes or slave nodes, the signals are transmitted to the BMC through signal lines for use.

Bmc_heart signal: also known as a heartbeat signal of the BMC. When the bmc_heart signal is normal, the BMC operates normally; conversely, when the bmc_heart signal is abnormal, the BMC operates abnormally. Nodes when the BMC operates abnormally cannot be used as the master node.

Master_disable signal: also known as a master-disable (prohibit this node from becoming the master node) signal sent by the BMC. When the master_disable signal is valid, this node cannot be used as the master node. It is known that the master_disable signal is a 10 ms pulse signal, and the master_disable signal is in an enabled state when the master_disable signal is at a high level. When designing, it is required to switch the master nodes according to a fixed order of ABCD when using the master_disable signal. For example, there are four nodes of ABCD in the storage controller, a current node B is a master node, after a master_disable signal sent by a BMC of the node B is valid, the node B is called a slave node and a node C is promoted to a master node. After the master_disable signal sent by the BMC of the node B is invalid, the node B can still become the master node when conditions are met.

In practical applications, each storage node can have corresponding check data, which can include a first character and a last character. For example, the check data can be different flag values obtained from the backplane when the storage nodes are inserted in different slots on the backplane.

In the specific implementation, it is determined whether the data of the storage node is valid by determining whether the first character and the last character are the same, and determining whether the first character and the last character are equal to a preset value.

For example, a preset value of a storage node X is 1. When a first character of check data of the storage node X is 1 and a last character is 1, it can be determined that data of the storage node X is valid.

In the embodiments of the present disclosure, it can be determined whether the first target node is the slave node at present when the first first character and the first last character are the same and the first first character and the first last character are the same as the preset value, and it is determined that there is no master node in the second target node, the third target node and the fourth target node based on the second heartbeat signal, the second master-disable signal, the third heartbeat signal, the third master-disable signal, the fourth heartbeat signal and the fourth master-disable signal; when the first target node is not the slave node at present, the first master-disable signal is invalid and the first heartbeat signal is in the normal state, the first target node is determined as the mast node; and after determining the master node, other nodes in the storage controller can be taken as slave nodes.

Figure 4:
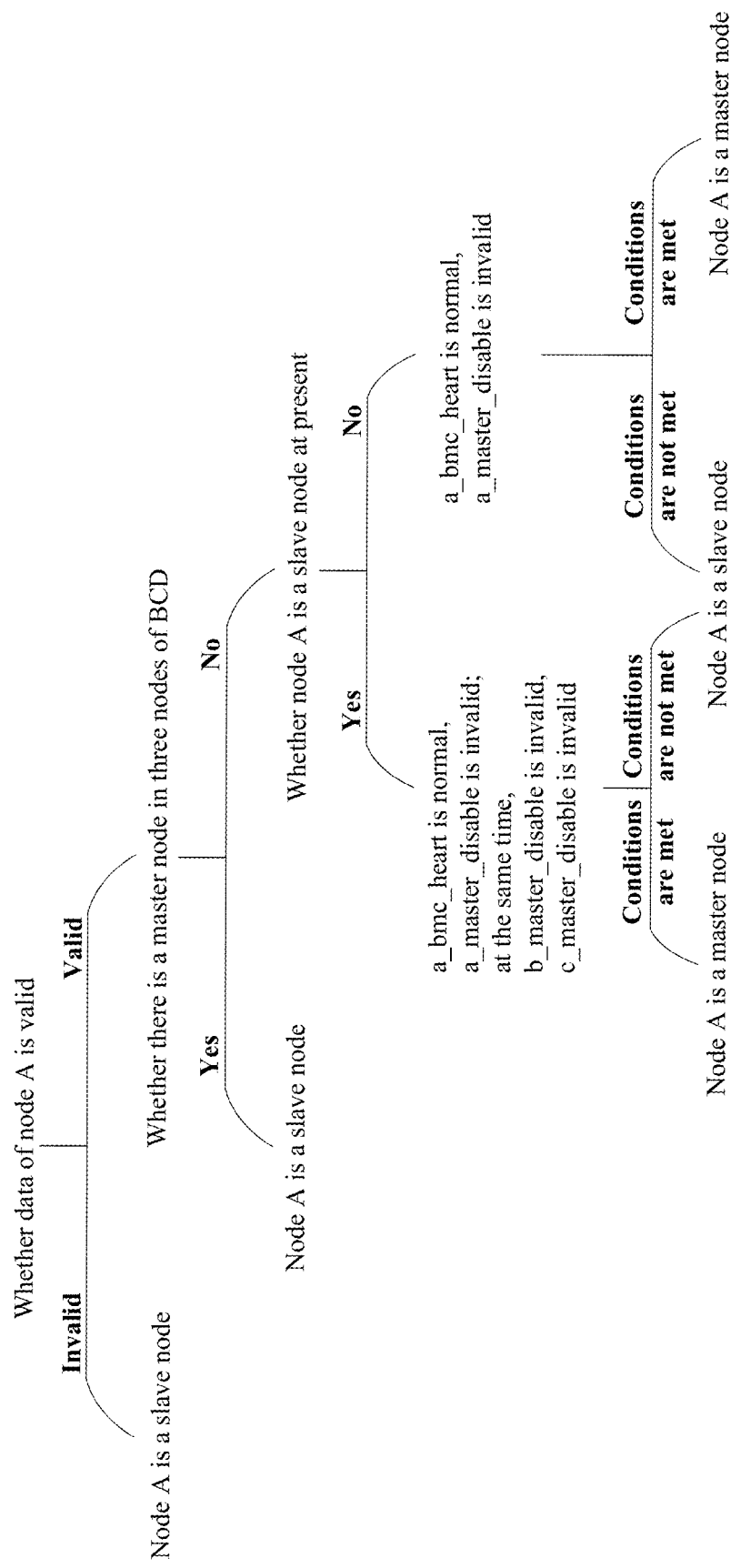
FIG. 4 is a schematic flowchart of steps of a method for determining a master-slave relationship of a first target node provided in an embodiment of the present disclosure.

For example, referring to FIG. 4, FIG. 4 is a schematic flowchart of steps of a method for determining a master-slave relationship of a first target node provided in an embodiment of the present disclosure. A node A can be equivalent to the first target node, a node B can be equivalent to the second target node, a node C can be equivalent to the third target node and a node D can be equivalent to the fourth target node. When a first first character and a first last character of check data of the node A are the same and the first first character and the first last character are the same as a preset value, that is, the data of the node A is valid, it is determined that there is no master node in the second target node, the third target node and the fourth target node based on the second heartbeat signal, the second master-disable signal, the third heartbeat signal, the third master-disable signal, the fourth heartbeat signal and the fourth master-disable signal, the node A is not a slave node at present, and the first heartbeat signal is in a normal state, the node A is determined as a master node.

According to the embodiments of the present disclosure, by determining the first target node, the second target node, the third target node and the fourth target node from the plurality of storage nodes, where the first target node includes first check data, which includes the first first character and the first last character; generating the first heartbeat signal and the first master-disable signal for the first target node; generating the second heartbeat signal and the second master-disable signal for the second target node; generating the third heartbeat signal and the third master-disable signal for the third target node; generating the fourth heartbeat signal and the fourth master-disable signal for the fourth target node; and determining the first target node as the master node in response to the first first character and the first last character being the same and the first first character and the first last character being the same as the preset value; determining that there is no master node in the second target node, the third target node and the fourth target node based on the second heartbeat signal, the second master-disable signal, the third heartbeat signal, the third master-disable signal, the fourth heartbeat signal and the fourth master-disable signal, the first target node being not the slave node, the first master-disable signal being invalid, and the first heartbeat signal being in the normal statem, the determination of the master node is realized.

On the basis of the foregoing embodiments, modified embodiments of the foregoing embodiments are proposed. It should be noted here that in order to make the description brief, only differences from the above-mentioned embodiments are described in the modified embodiments.

Referring to FIG. 4, in some embodiments of the present disclosure, the first target node can be determined as the master node when the first target node is the slave node, the first heartbeat signal is in the normal state, the first master-disable signal is invalid, the second master-disable signal is invalid, and the third master-disable signal is invalid.

The first target node is determined as the slave node when the first target node is the slave node, the first heartbeat signal is in an abnormal state, and/or the first master-disable signal is valid, and/or the second master-disable signal is valid, and/or the third master-disable signal is valid.

The first target node is determined as the slave node when the first target node is not the slave node, the first heartbeat signal is in the abnormal state, and/or the first master-disable signal is valid.

The first target node is determined as the slave node when the first first character and the first last character are different, and/or the first first character and the first last character are different from the preset value.

Figure 5:
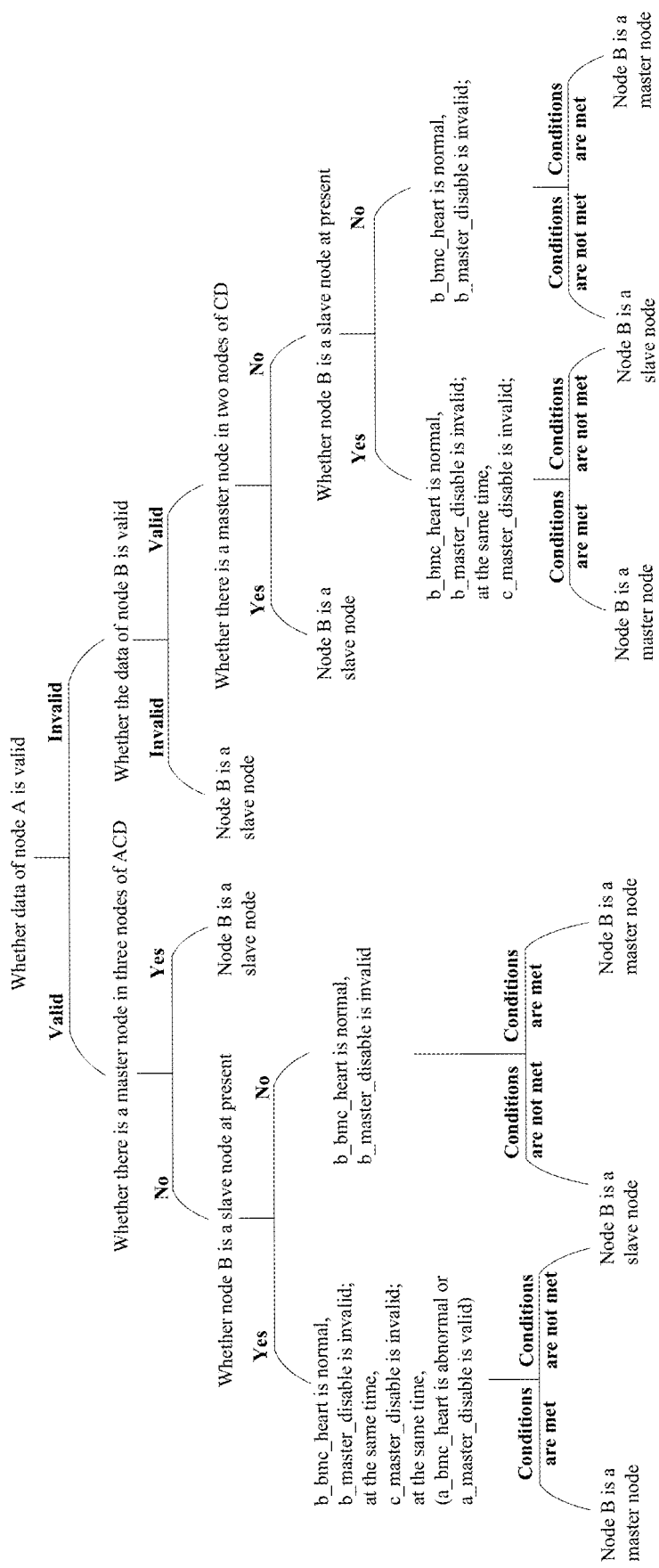
FIG. 5 is a schematic flowchart of steps of a method for determining a master-slave relationship of a second target node provided in an embodiment of the present disclosure.

Referring to FIG. 5, FIG. 5 is a schematic flowchart of steps of a method for determining a master-slave relationship of a second target node provided in an embodiment of the present disclosure. The node A can be equivalent to the first target node, the node B can be equivalent to the second target node, the node C can be equivalent to the third target node and the node D can be equivalent to the fourth target node. In some embodiments of the present disclosure, it can be determined whether there is a master node in the first target node, the third target node and the fourth target node based on the first heartbeat signal, the first master-disable signal, the third heartbeat signal, the third master-disable signal, the fourth heartbeat signal and the fourth master-disable signal when the first first character and the first last character are the same, and the first first character and the first last character are the same as the preset value.

When it is determined that that there is no master node in the first target node, the third target node and the fourth target node, the second target node is not a slave node, the second heartbeat signal is in the normal state, and the second master-disable signal is invalid, the second target node is determined as a master node.

When it is determined that that there is no master node in the first target node, the third target node and the fourth target node, the second target node is the slave node, the second heartbeat signal is in the normal state, the second master-disable signal is invalid, the third master-disable signal is invalid, and the first heartbeat signal is in an abnormal state or the first master-disable signal is valid, the second target node is determined as the master node. Therefore, the determination of the second target node as the master node is realized, and the efficiency of determining the master-slave storage node for the storage node is further improved.

Referring to FIG. 5, in some embodiments of the present disclosure, the second target node can be determined as the slave node when it is determined that there is the master node in the first target node, the third target node and the fourth target node.

When it is determined that there is no master node in the first target node, the third target node and the fourth target node, the second target node is the slave node, the second heartbeat signal is in the abnormal state, and/or the second master-disable signal is valid, and/or the third master-disable signal is valid, and/or the first heartbeat signal is in the normal state, and/or the first master-disable signal is invalid, the second target node is determined as the slave node.

When it is determined that there is no master node in the first target node, the third target node and the fourth target node, the second target node is not the slave node, the second heartbeat signal is in the abnormal state, and/or the second master-disable signal is valid, the second target node is determined as the slave node. Therefore, the determination of the second target node as the slave node is realized, and the efficiency of determining the master-slave storage node for the storage node is further improved.

Referring to FIG. 5, in some embodiments of the present disclosure, the second target node includes second check data, which includes a second first character and a second last character, and it can be determined whether there is a master node in the third target node and the fourth target node based on the third heartbeat signal, the third master-disable signal, the fourth heartbeat signal and the fourth master-disable signal when the first first character and the first last character are different and/or the first first character and the first last character are different from the preset value, and the second first character and the second last character are the same and the second first character and the second last character are the same as the preset value.

When it is determined that there is no master node in the third target node and the fourth target node, the second target node is not the slave node, the second heartbeat signal is in the normal state and the second master-disable signal is invalid, the second target node is determined as the master node.

When it is determined that there is no master node in the third target node and the fourth target node, the second target node is the slave node, the second heartbeat signal is in the normal state, the second master-disable signal is invalid and the third master-disable signal is invalid, the second target node is determined as the master node. Therefore, the determination of the second target node as the master node is realized, and the efficiency of determining the master-slave storage node for the storage node is further improved.

Referring to FIG. 5, in some embodiments of the present disclosure, the second target node can be determined as the slave node when the first first character and the first last character are different and/or the first first character and the first last character are different from the preset value, and the second first character and the second last character are different and/or the second first character and the second last character are different from the preset value.

When the first first character and the first last character are different and/or the first first character and the first last character are different from the preset value, the second first character and the second last character are the same and the second first character and the second last character are the same as the preset value, and it is determined that there is the master node in the third target node and the fourth target node, the second target node is determined as the slave node.

When the second target node is not the slave node, the second heartbeat signal is in the abnormal state, and/or the second master-disable signal is valid, the second target node is determined as the slave node.

When the second target node is the slave node, the second heartbeat signal is in the abnormal state, and/or the second master-disable signal is valid, and/or the third master-disable signal is valid, the second target node is determined as the slave node. Therefore, the determination of the second target node as the slave node is realized, and the efficiency of determining the master-slave storage node for the storage node is further improved.

Figure 6:
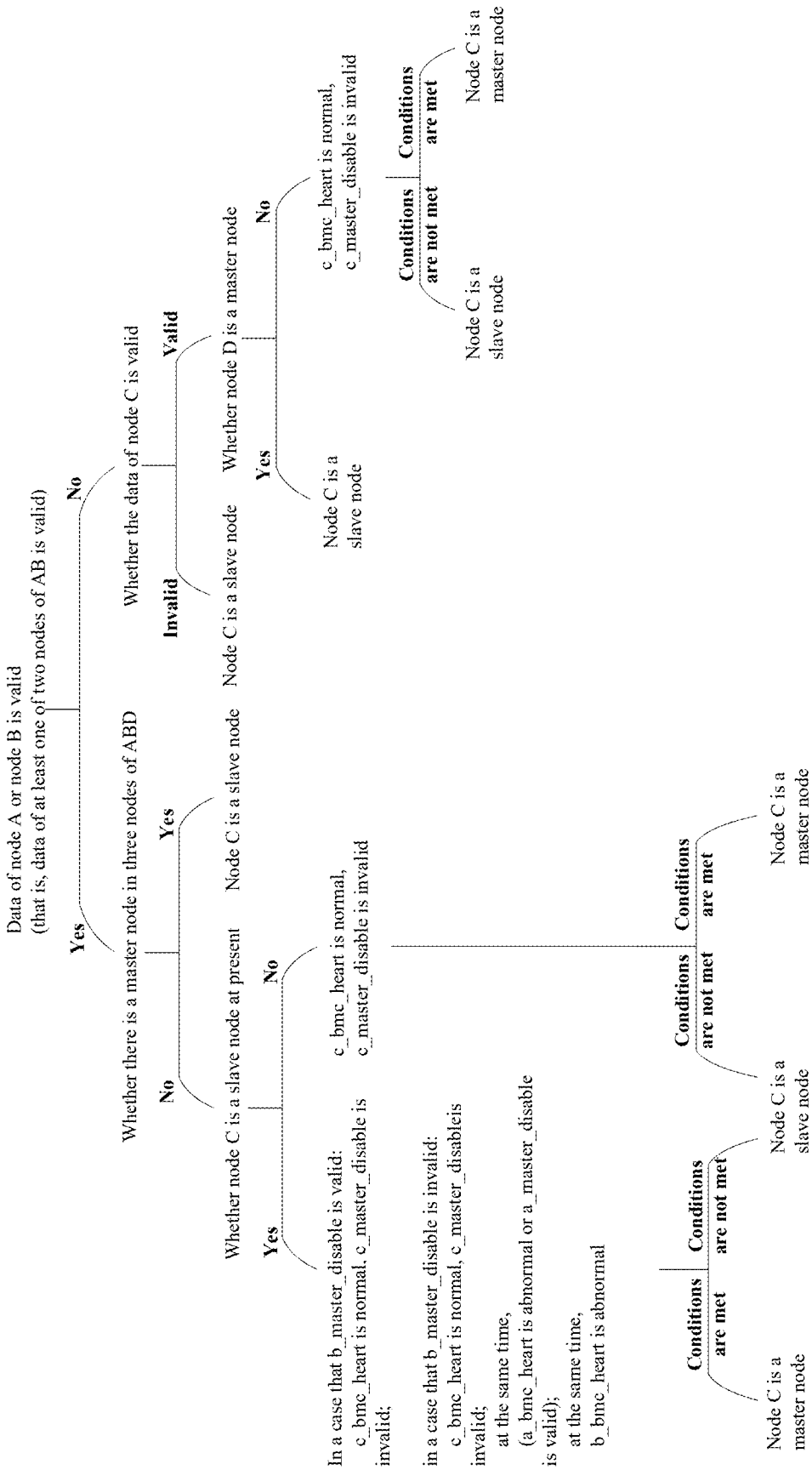
FIG. 6 is a schematic flowchart of steps of a method for determining a master-slave relationship of a third target node provided in an embodiment of the present disclosure.

Referring to FIG. 6, FIG. 6 is a schematic flowchart of steps of a method for determining a master-slave relationship of a third target node provided in an embodiment of the present disclosure. The node A can be equivalent to the first target node, the node B can be equivalent to the second target node, the node C can be equivalent to the third target node and the node D can be equivalent to the fourth target node. In some embodiments of the present disclosure, it can be determined whether there is a master node in the first target node, the second target node and the fourth target node based on the first heartbeat signal, the first master-disable signal, the second heartbeat signal, the second master-disable signal, the fourth heartbeat signal and the fourth master-disable signal when the first first character and the first last character are the same and the first first character and the first last character are the same as the preset value, or the second first character and the second last character are the same and the second first character and the second last character are the same as the preset value.

When it is determined that there is no master node in the first target node, the second target node and the fourth target node, the third target node is not a slave node, the third heartbeat signal is in the normal state, and the third master-disable signal is invalid, the third target node is determined as a master node.

When it is determined that there is no master node in the first target node, the second target node and the fourth target node, the third target node is the slave node, the second master-disable signal is valid, the third heartbeat signal is in the normal state, and the third master-disable signal is invalid, the third target node is determined as the master node.

When it is determined that there is no master node in the first target node, the second target node and the fourth target node, the third target node is the slave node, the second master-disable signal is invalid, the third heartbeat signal is in the normal state, the third master-disable signal is invalid, the first heartbeat signal is in the abnormal state or the first master-disable signal is valid, and the second heartbeat signal is in the abnormal state, the third target node is determined as the master node. Therefore, the determination of the third target node as the master node is realized, and the efficiency of determining the master-slave storage node for the storage node is further improved.

Referring to FIG. 6, in some embodiments of the present disclosure, the third target node can be determined as the slave node when it is determined that there is the master node in the first target node, the second target node and the fourth target node.

When it is determined that there is no master node in the first target node, the second target node and the fourth target node, the third target node is not the slave node, the third heartbeat signal is in the abnormal state, and/or the third master-disable signal is valid, the third target node is determined as the slave node.

When it is determined that there is no master node in the first target node, the second target node and the fourth target node, the third target node is the slave node, the second master-disable signal is valid, the third heartbeat signal is in the abnormal state, and/or the third master-disable signal is valid, the third target node is determined as the slave node.

When it is determined that there is no master node in the first target node, the second target node and the fourth target node, the third target node is the slave node, the second master-disable signal is invalid, the third heartbeat signal is in the abnormal state, and/or the third master-disable signal is valid, and/or the first heartbeat signal is in the normal state, and/or the first master-disable signal is invalid, and/or the second heartbeat signal is in the normal state, the third target node is determined as the slave node. Therefore, the determination of the third target node as the slave node is realized, and the efficiency of determining the master-slave storage node for the storage node is further improved.

Referring to FIG. 6, in some embodiments of the present disclosure, the third target node includes third check data, which includes a third first character and a third last character, and it can be determined whether the fourth target node is a master node based on the fourth heartbeat signal and the fourth master-disable signal when the first first character and the first last character are different and/or the first first character and the first last character are different from the preset value, the second first character and the second last character are different and/or the second first character and the second last character are different from the preset value, and the third first character and the third last character are the same and the third first character and the third last character are the same as the preset value.

When it is determined that the fourth target node is not the master node, the third heartbeat signal is in the normal state, and the third master-disable signal is invalid, the third target node is determined as the master node. Therefore, the determination of the third target node as the master node is realized, and the efficiency of determining the master-slave storage node for the storage node is further improved.

Referring to FIG. 6, in some embodiments of the present disclosure, the third target node can be determined as the slave node when the first first character and the first last character are different and/or the first first character and the first last character are different from the preset value, the second first character and the second last character are different and/or the second first character and the second last character are different from the preset value, and the third first character and the third last character are different and/or the third first character and the third last character are different from the preset value.

When the first first character and the first last character are different and/or the first first character and the first last character are different from the preset value, the second first character and the second last character are different and/or the second first character and the second last character are different from the preset value, the third first character and the third last character are the same and the third first character and the third last character are the same as the preset value, and it is determined that the fourth target node is the master node, the third target node is determined as the slave node.

When the first first character and the first last character are different and/or the first first character and the first last character are different from the preset value, the second first character and the second last character are different and/or the second first character and the second last character are different from the preset value, the third first character and the third last character are the same and the third first character and the third last character are the same as the preset value, it is determined that the fourth target node is not the master node, and the third heartbeat signal is in the abnormal state and/or the third master-disable signal is valid, the third target node is determined as the slave node. Therefore, the determination of the third target node as the slave node is realized, and the efficiency of determining the master-slave storage node for the storage node is further improved.

Figure 7:
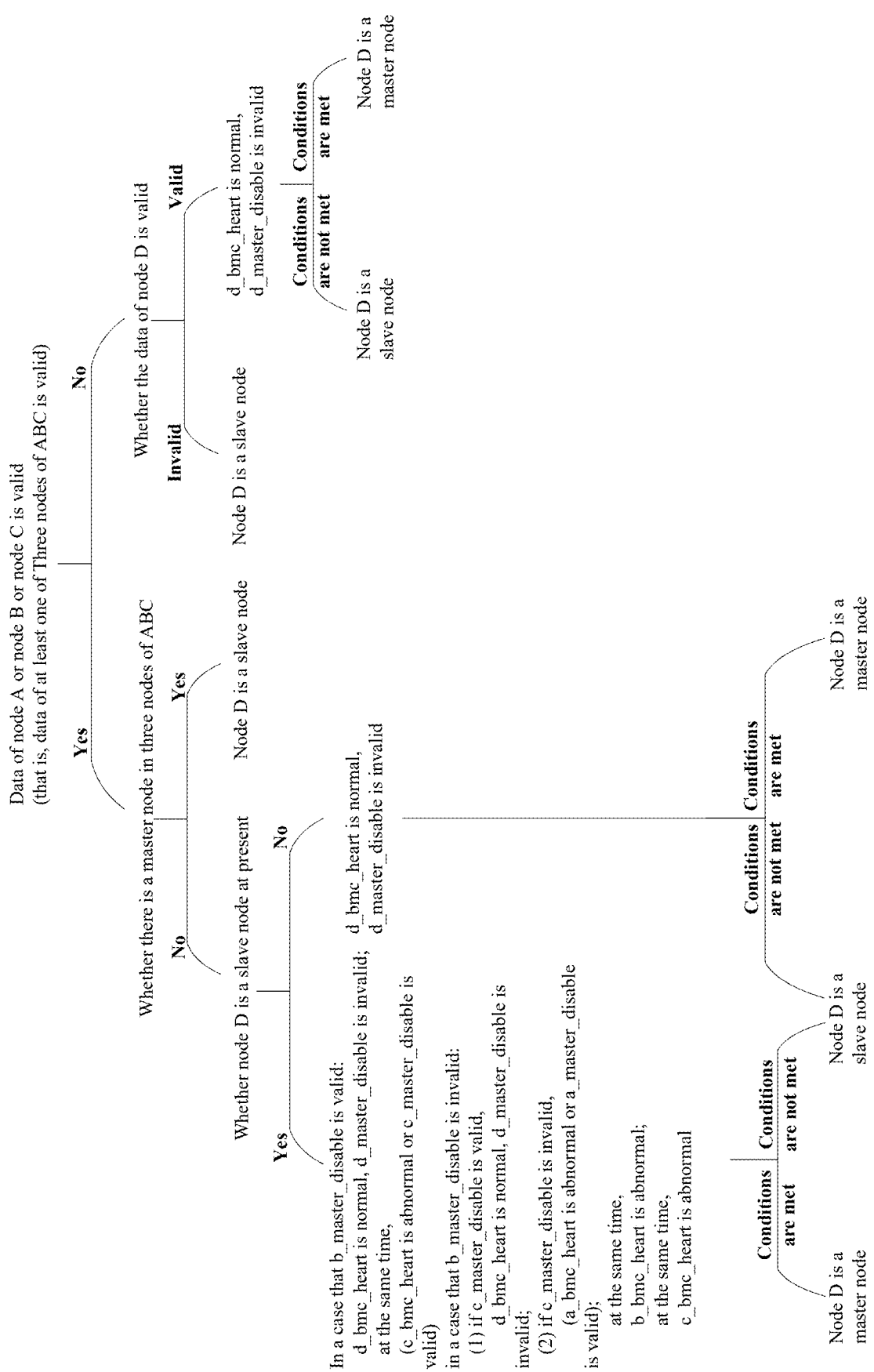
FIG. 7 is a schematic flowchart of steps of a method for determining a master-slave relationship of a fourth target node provided in an embodiment of the present disclosure.

Referring to FIG. 7, FIG. 7 is a schematic flowchart of steps of a method for determining a master-slave relationship of a fourth target node provided in an embodiment of the present disclosure. The node A can be equivalent to the first target node, the node B can be equivalent to the second target node, the node C can be equivalent to the third target node and the node D can be equivalent to the fourth target node. In some embodiments of the present disclosure, it can be determined whether any of the first target node, the second target node and the third target node is a master node based on the first heartbeat signal, the first master-disable signal, the second heartbeat signal, the second master-disable signal, the third heartbeat signal and the third master-disable signal when the first first character and the first last character are the same and the first first character and the first last character are the same as the preset value, or the second first character and the second last character are the same and the second first character and the second last character are the same as the preset value, or the third first character and the third last character are the same and the third first character and the third last character are the same as the preset value.

When it is determined that there is no master node in the first target node, the second target node and the third target node, the fourth target node is not the slave node, the fourth heartbeat signal is in the normal state, and the fourth master-disable signal is invalid, the fourth target node is determined as the master node.

When it is determined that there is no master node in the first target node, the second target node and the third target node, the fourth target node is the slave node, the second master-disable signal is valid, the fourth heartbeat signal is in the normal state, the fourth master-disable signal is invalid, and the third heartbeat signal is in the abnormal state or the third master-disable signal is valid, the fourth target node is determined as the master node.

When it is determined that there is no master node in the first target node, the second target node and the third target node, the fourth target node is the slave node, the second master-disable signal is invalid, the third master-disable signal is valid, the fourth heartbeat signal is in the normal state, and the fourth master-disable signal is invalid, the fourth target node is determined as the master node.

When it is determined that there is no master node in the first target node, the second target node and the third target node, the fourth target node is the slave node, the second master-disable signal is invalid, the third master-disable signal is invalid, the first heartbeat signal is in the abnormal state or the first master-disable signal is valid, the second heartbeat signal is in the abnormal state, and the third heartbeat signal is in the abnormal state, the fourth target node is determined as the master node. Therefore, the determination of the fourth target node as the master node is realized, and the efficiency of determining the master-slave storage node for the storage node is further improved.

Referring to FIG. 7, in some embodiments of the present disclosure, when it is determined that there is no master node in the first target node, the second target node and the third target node, the fourth target node is not the slave node, and the fourth heartbeat signal is in the abnormal state, and/or the fourth master-disable signal is invalid, the fourth target node is determined as a slave node.

When it is determined that there is no master node in the first target node, the second target node and the third target node, the fourth target node is the slave node, the second master-disable signal is valid, the fourth heartbeat signal is in the abnormal state, and/or the fourth master-disable signal is valid, the third heartbeat signal is in the abnormal state, and/or the third master-disable signal is valid, the fourth target node is determined as the slave node.

When it is determined that there is no master node in the first target node, the second target node and the third target node, the fourth target node is the slave node, the second master-disable signal is invalid, the third master-disable signal is valid, the fourth heartbeat signal is in the abnormal state, and/or the fourth master-disable signal is valid, the fourth target node is determined as the slave node.

When it is determined that there is no master node in the first target node, the second target node and the third target node, the fourth target node is the slave node, the second master-disable signal is invalid, the third master-disable signal is invalid, the first heartbeat signal is in the normal state, and/or the first master-disable signal is invalid, and/or the second heartbeat signal is in the normal state, and/or the third heartbeat signal is in the normal state, the fourth target node is determined as the slave node.

When it is determined that there is the master node in the first target node, the second target node and the third target node, the fourth target node is determined as the slave node. Therefore, the determination of the fourth target node as the slave node is realized, and the efficiency of determining the master-slave storage node for the storage node is further improved.

Referring to FIG. 7, in some embodiments of the present disclosure, the fourth target node includes fourth check data, which includes a fourth first character and a fourth last character, and the fourth target node can be determined as the master node when the first first character and the first last character are different and/or the first first character and the first last character are different from the preset value, the second first character and the second last character are different and/or the second first character and the second last character are different from the preset value, the third first character and the third last character are different and/or the third first character and the third last character are different from the preset value, the fourth first character and the fourth last character are the same and the fourth first character and the fourth last character are the same as the preset value, the fourth heartbeat signal is in the normal state, and the fourth master-disable signal is invalid. Therefore, the determination of the fourth target node as the master node is realized, and the efficiency of determining the master-slave storage node for the storage node is further improved.

Referring to FIG. 7, in some embodiments of the present disclosure, the fourth target node can be determined as the slave node when the fourth first character and the fourth last character are different, and/or the fourth first character and the fourth last character are different from the preset value.

When the fourth first character and the fourth last character are the same and the fourth first character and the fourth last character are the same as the preset value, the fourth heartbeat signal is in the abnormal state, and/or the fourth master signal is valid, the fourth target node is determined as the slave node. Therefore, the determination of the fourth target node as the slave node is realized, and the efficiency of determining the master-slave storage node for the storage node is further improved.

It should be noted that for the sake of simple description, the method embodiments are all expressed as a series of action combinations. However, a person skilled in the art should know that these embodiments of the present disclosure are not limited by the order of the described actions, as certain steps can be performed in other orders or at the same time according to the embodiments of the present disclosure. Secondly, a person skilled in the art should also know that the embodiments described in the specification belong to some embodiments of the present disclosure, and the actions involved are not necessarily necessary for the embodiments of the present disclosure.

Figure 8:
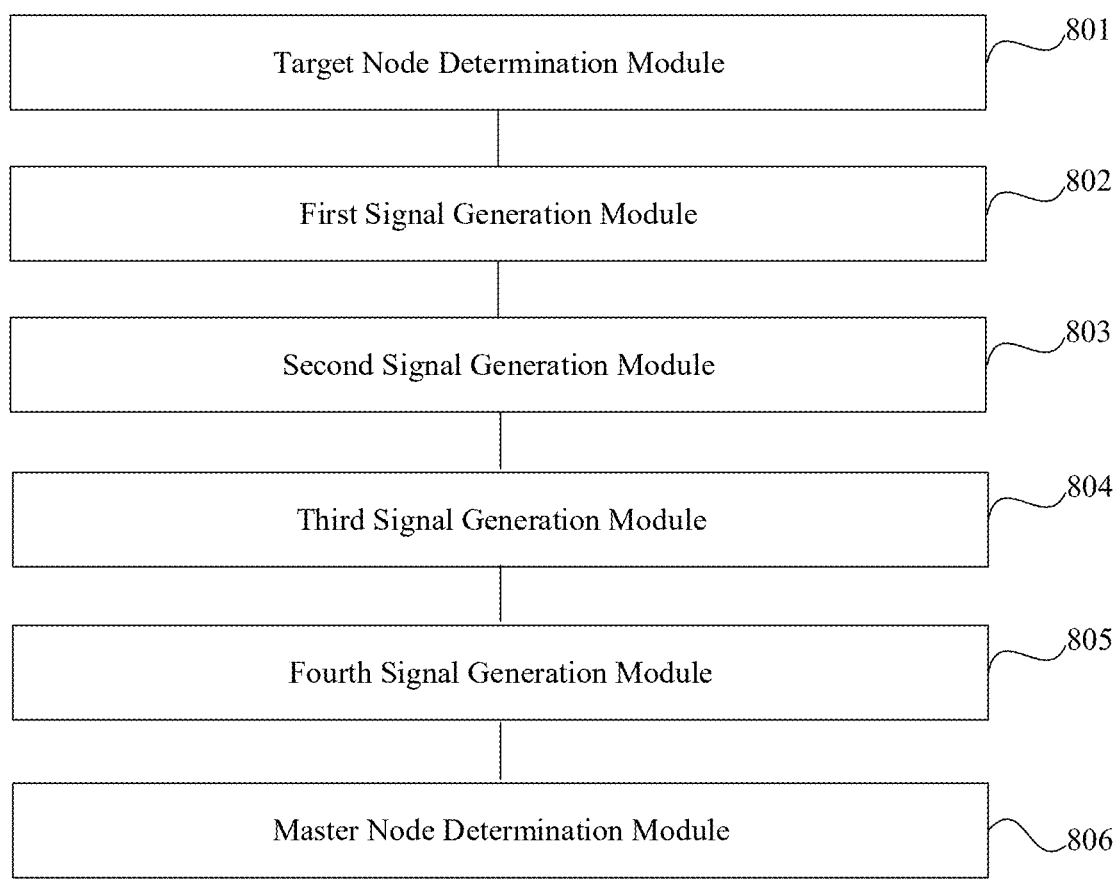
FIG. 8 is a structural block diagram of an apparatus for determining a master-slave node provided in an embodiment of the present disclosure.

Referring to FIG. 8, FIG. 8 is a structural block diagram of an apparatus for determining a master-slave node provided in an embodiment of the present disclosure. The apparatus can include following modules:

- a target node determination module 801 configured to determine a first target node, a second target node, a third target node and a fourth target node from the plurality of storage nodes, where the first target node includes first check data, which includes a first first character and a first last character;
- a first signal generation module 802 configured to generate a first heartbeat signal and a first master-disable signal for the first target node;
- a second signal generation module 803 configured to generate a second heartbeat signal and a second master-disable signal for the second target node;
- a third signal generation module 804 configured to generate a third heartbeat signal and a third master-disable signal for the third target node;
- a fourth signal generation module 805 configured to generate a fourth heartbeat signal and a fourth master-disable signal for the fourth target node; and
- a master node determination module 806 configured to determine the first target node as a master node in response to the first first character and the first last character being the same and the first first character and the first last character being the same as a preset value, determining that there is no master node in the second target node, the third target node and the fourth target node based on the second heartbeat signal, the second master-disable signal, the third heartbeat signal, the third master-disable signal, the fourth heartbeat signal and the fourth master-disable signal, the first target node being not a slave node, the first master-disable signal being invalid, and the first heartbeat signal being in a normal state.

In some embodiments of the present disclosure, the apparatus further includes:

- a first module configured to determine the first target node as the master node in response to the first target node being the slave node, the first heartbeat signal being in the normal state, the first master-disable signal being invalid, the second master-disable signal being invalid, and the third master-disable signal being invalid;
- a second module configured to determine the first target node as the slave node in response to the first target node being the slave node, the first heartbeat signal being in an abnormal state, and/or the first master-disable signal being valid, and/or the second master-disable signal being valid, and/or the third master-disable signal being valid;
- a third module configured to determine the first target node as the slave node in response to the first target node being not the slave node, the first heartbeat signal being in the abnormal state, and/or the first master-disable signal being valid; and
- a fourth module configured to determine the first target node as the slave node in response to the first first character and the first last character being different, and/or the first first character and the first last character being different from the preset value.

In some embodiments of the present disclosure, the apparatus further includes:

- a fifth module configured to determine whether there is a master node in the first target node, the third target node and the fourth target node based on the first heartbeat signal, the first master-disable signal, the third heartbeat signal, the third master-disable signal, the fourth heartbeat signal and the fourth master-disable signal in response to the first first character and the first last character being the same, and the first first character and the first last character being the same as the preset value;
- a sixth module configured to determine the second target node as a master node in response to determining that there is no master node in the first target node, the third target node and the fourth target node, the second target node being not a slave node, the second heartbeat signal being in the normal state, and the second master-disable signal being invalid; and
- a seventh module configured to determine the second target node as the master node in response to determining that there is no master node in the first target node, the third target node and the fourth target node, the second target node being the slave node, the second heartbeat signal being in the normal state, the second master-disable signal being invalid, the third master-disable signal being invalid, and the first heartbeat signal being in an abnormal state or the first master-disable signal being valid.

In some embodiments of the present disclosure, the apparatus further includes:

- an eighth module configured to determine the second target node as the slave node in response to determining that there is the master node in the first target node, the third target node and the fourth target node;
- a ninth module configured to determine the second target node as the slave node in response to determining that there is no master node in the first target node, the third target node and the fourth target node, the second target node being the slave node, the second heartbeat signal being in the abnormal state, and/or the second master-disable signal being valid, and/or the third master-disable signal being valid, and/or the first heartbeat signal being in the normal state, and/or the first master-disable signal being invalid; and
- a tenth module configured to determine the second target node as the slave node in response to determining that there is no master node in the first target node, the third target node and the fourth target node, the second target node being not the slave node, the second heartbeat signal being in the abnormal state, and/or the second master-disable signal being valid.

In some embodiments of the present disclosure, the second target node includes second check data, which includes a second first character and a second last character, and the apparatus further includes:
- an eleventh module configured to determine whether there is a master node in the third target node and the fourth target node based on the third heartbeat signal, the third master-disable signal, the fourth heartbeat signal and the fourth master-disable signal in response to the first first character and the first last character being different and/or the first first character and the first last character being different from the preset value, and the second first character and the second last character being the same and the second first character and the second last character being the same as the preset value;
- a twelfth module configured to determine the second target node as the master node in response to determining that there is no master node in the third target node and the fourth target node, the second target node being not the slave node, the second heartbeat signal being in the normal state and the second master-disable signal being invalid; and
- a thirteenth module configured to determine the second target node as the master node in response to determining that there is no master node in the third target node and the fourth target node, the second target node being the slave node, the second heartbeat signal being in the normal state, the second master-disable signal being invalid and the third master-disable signal being invalid.

In some embodiments of the present disclosure, the apparatus further includes:
- a fourteenth module configured to determine the second target node as the slave node in response to the first first character and the first last character being different and/or the first first character and the first last character being different from the preset value, and the second first character and the second last character being different and/or the second first character and the second last character being different from the preset value; and
- a fifteenth module configured to determine the second target node as the slave node in response to the first first character and the first last character being different and/or the first first character and the first last character being different from the preset value, the second first character and the second last character being the same and the second first character and the second last character being the same as the preset value, and determining that there is the master node in the third target node and the fourth target node.

In some embodiments of the present disclosure, the apparatus further includes:
- a sixteenth module configured to determine the second target node as the slave node in response to the second target node being not the slave node, the second heartbeat signal being in the abnormal state, and/or the second master-disable signal being valid; and
- a seventeenth module configured to determine the second target node as the slave node in response to the second target node being the slave node, the second heartbeat signal being in the abnormal state, and/or the second master-disable signal being valid, and/or the third master-disable signal being valid.

In some embodiments of the present disclosure, the apparatus further includes:
- an eighteenth module configured to determine whether there is a master node in the first target node, the second target node and the fourth target node based on the first heartbeat signal, the first master-disable signal, the second heartbeat signal, the second master-disable signal, the fourth heartbeat signal and the fourth master-disable signal in response to the first first character and the first last character being the same and the first first character and the first last character being the same as the preset value, or the second first character and the second last character being the same and the second first character and the second last character being the same as the preset value;
- a nineteenth module configured to determine the third target node as a master node in response to determining that there is no master node in the first target node, the second target node and the fourth target node, the third target node being not a slave node, the third heartbeat signal being in the normal state, and the third master-disable signal being invalid;
- a twentieth module configured to determine the third target node as the master node in response to determining that there is no master node in the first target node, the second target node and the fourth target node, the third target node being the slave node, the second master-disable signal being valid, the third heartbeat signal being in the normal state, and the third master-disable signal being invalid; and
- a twenty-first module configured to determine the third target node as the master node in response to determining that there is no master node in the first target node, the second target node and the fourth target node, the third target node being the slave node, the second master-disable signal being invalid, the third heartbeat signal being in the normal state, the third master-disable signal being invalid, the first heartbeat signal being in the abnormal state or the first master-disable signal being valid, and the second heartbeat signal being in the abnormal state.

In some embodiments of the present disclosure, the apparatus further includes:
- a twenty-second module configured to determine the third target node as the slave node in response to determining that there is the master node in the first target node, the second target node and the fourth target node;
- a twenty-third module configured to determine the third target node as the slave node in response to determining that there is no master node in the first target node, the second target node and the fourth target node, the third target node being not the slave node, the third heartbeat signal being in the abnormal state, and/or the third master-disable signal being valid;
- a twenty-fourth module configured to determine the third target node as the slave node in response to determining that there is no master node in the first target node, the second target node and the fourth target node, the third target node being the slave node, the second master-disable signal being valid, the third heartbeat signal being in the abnormal state, and/or the third master-disable signal being valid; and
- a twenty-fifth module configured to determine the third target node as the slave node in response to determining that there is no master node in the first target node, the second target node and the fourth target node, the third target node being the slave node, the second master-disable signal being invalid, the third heartbeat signal being in the abnormal state, and/or the third master-disable signal being valid, and/or the first heartbeat signal being in the normal state, and/or the first master-disable signal being invalid, and/or the second heartbeat signal being in the normal state.

In some embodiments of the present disclosure, the third target node includes third check data, which includes a third first character and a third last character, and the apparatus further includes:
  a twenty-sixth module configured to determine whether the fourth target node is a master node based on the fourth heartbeat signal and the fourth master-disable signal in response to the first first character and the first last character being different and/or the first first character and the first last character being different from the preset value, the second first character and the second last character being different and/or the second first character and the second last character being different from the preset value, and the third first character and the third last character being the same and the third first character and the third last character being the same as the preset value; and
  a twenty-seventh module configured to determine the third target node as the master node in response to determining that the fourth target node is not the master node, the third heartbeat signal is in the normal state, and the third master-disable signal is invalid.

In some embodiments of the present disclosure, the apparatus further includes:
  a twenty-eighth module configured to determine the third target node as the slave node in response to the first first character and the first last character being different and/or the first first character and the first last character being different from the preset value, the second first character and the second last character being different and/or the second first character and the second last character being different from the preset value, and the third first character and the third last character being different and/or the third first character and the third last character being different from the preset value;
  a twenty-ninth module configured to determine the third target node as the slave node in response to the first first character and the first last character being different and/or the first first character and the first last character being different from the preset value, the second first character and the second last character being different and/or the second first character and the second last character being different from the preset value, the third first character and the third last character being the same and the third first character and the third last character being the same as the preset value, and determining that the fourth target node is the master node; and
  a thirtieth module configured to determine the third target node as the slave node in response to the first first character and the first last character being different and/or the first first character and the first last character being different from the preset value, the second first character and the second last character being different and/or the second first character and the second last character being different from the preset value, the third first character and the third last character being the same and the third first character and the third last character being the same as the preset value, determining that the fourth target node is not the master node, and the third heartbeat signal being in the abnormal state and/or the third master-disable signal being valid.

In some embodiments of the present disclosure, the apparatus further includes:
  a thirty-first module configured to determine whether any of the first target node, the second target node and the third target node is a master node based on the first heartbeat signal, the first master-disable signal, the second heartbeat signal, the second master-disable signal, the third heartbeat signal and the third master-disable signal in response to the first first character and the first last character being the same and the first first character and the first last character being the same as the preset value, or the second first character and the second last character being the same and the second first character and the second last character being the same as the preset value, or the third first character and the third last character being the same and the third first character and the third last character being the same as the preset value;
  a thirty-second module configured to determine the fourth target node as the master node in response to determining that there is no master node in the first target node, the second target node and the third target node, the fourth target node being not the slave node, the fourth heartbeat signal being in the normal state, and the fourth master-disable signal being invalid;
  a thirty-third module configured to determine the fourth target node as the master node in response to determining that there is no master node in the first target node, the second target node and the third target node, the fourth target node being the slave node, the second master-disable signal being valid, the fourth heartbeat signal being in the normal state, the fourth master-disable signal being invalid, and the third heartbeat signal being in the abnormal state or the third master-disable signal being valid;
  a thirty-fourth module configured to determine the fourth target node as the master node in response to determining that there is no master node in the first target node, the second target node and the third target node, the fourth target node being the slave node, the second master-disable signal being invalid, the third master-disable signal being valid, the fourth heartbeat signal being in the normal state, and the fourth master-disable signal being invalid; and
  a thirty-fifth module configured to determine the fourth target node as the master node in response to determining that there is no master node in the first target node, the second target node and the third target node, the fourth target node being the slave node, the second master-disable signal being invalid, the third master-disable signal being invalid, the first heartbeat signal being in the abnormal state or the first master-disable signal being valid, the second heartbeat signal being in the abnormal state, and the third heartbeat signal being in the abnormal state.

In some embodiments of the present disclosure, the apparatus further includes:
  a thirty-sixth module configured to determine the fourth target node as a slave node in response to determining that there is no master node in the first target node, the second target node and the third target node, the fourth target node being not the slave node, and the fourth heartbeat signal being in the abnormal state, and/or the fourth master-disable signal being invalid;

a thirty-seventh module configured to determine the fourth target node as the slave node in response to determining that there is no master node in the first target node, the second target node and the third target node, the fourth target node being the slave node, the second master-disable signal being valid, the fourth heartbeat signal being in the abnormal state, and/or the fourth master-disable signal being valid, the third heartbeat signal being in the abnormal state, and/or the third master-disable signal being valid;

a thirty-eighth module configured to determine the fourth target node as the slave node in response to determining that there is no master node in the first target node, the second target node and the third target node, the fourth target node being the slave node, the second master-disable signal being invalid, the third master-disable signal being valid, the fourth heartbeat signal being in the abnormal state, and/or the fourth master-disable signal being valid;

a thirty-ninth module configured to determine the fourth target node as the slave node in response to determining that there is no master node in the first target node, the second target node and the third target node, the fourth target node being the slave node, the second master-disable signal being invalid, the third master-disable signal being invalid, the first heartbeat signal being in the normal state, and/or the first master-disable signal being invalid, and/or the second heartbeat signal being in the normal state, and/or the third heartbeat signal being in the normal state; and a fortieth module configured to determine the fourth target node as the slave node in response to determining that there is the master node in the first target node, the second target node and the third target node.

In some embodiments of the present disclosure, the fourth target node includes fourth check data, which includes a fourth first character and a fourth last character, and the apparatus further includes:

a forty-first module configured to determine the fourth target node as the master node in response to the first first character and the first last character being different and/or the first first character and the first last character being different from the preset value, the second first character and the second last character being different and/or the second first character and the second last character being different from the preset value, the third first character and the third last character being different and/or the third first character and the third last character being different from the preset value, the fourth first character and the fourth last character being the same and the fourth first character and the fourth last character being the same as the preset value, the fourth heartbeat signal being in the normal state, and the fourth master-disable signal being invalid.

In some embodiments of the present disclosure, the apparatus further includes:

a forty-second module configured to determine the fourth target node as the slave node in response to the fourth first character and the fourth last character being different, and/or the fourth first character and the fourth last character being different from the preset value; and a forty-third module configured to determine the fourth target node as the slave node in response to the fourth first character and the fourth last character being the same and the fourth first character and the fourth last character being the same as the preset value, the fourth heartbeat signal being in the abnormal state, and/or the fourth master signal being valid.

In some embodiments of the present disclosure, the first target node, the second target node, the third target node and the fourth target node respectively have corresponding baseboard management controllers (BMCs), which are configured to generate the first heartbeat signal and the first master-disable signal for the first target node, the second heartbeat signal and the second master-disable signal for the second target node, the third heartbeat signal and the third master-disable signal for the third target node, and the fourth heartbeat signal and the fourth master-disable signal for the fourth target node.

In some embodiments of the present disclosure, the multi-node server includes a complex programmable logic device (CPLD), which is configured to determine the first target node, the second target node, the third target node and the fourth target node as master nodes or slave nodes.

The apparatus embodiments are substantially similar to the method embodiments, and thus the description is relatively simple, and the relevant points can be found in part of the description of the method embodiments.

In addition, the embodiment of the present disclosure further provides an electronic device, including: a processor, a memory and a computer program stored in the memory and executable on the processor, where the computer program, when executed by the processor, implements the processes of the method for determining the master-slave node in the foregoing embodiments, and can achieve the same technical effects. To avoid repetition, details are not described herein again.

The embodiment of the present disclosure further provides a non-transitory computer readable storage medium. The non-transitory computer readable storage medium stores a computer program, where the computer program, when executed by a processor, implements the processes of the method for determining the master-slave node in the foregoing embodiments, and can achieve the same technical effects. To avoid repetition, details are not described herein again. For example, the non-transitory computer readable storage medium includes a read-only memory (ROM), a random access memory (RAM), a magnetic disk, an optical disc, or the like.

Figure 9:
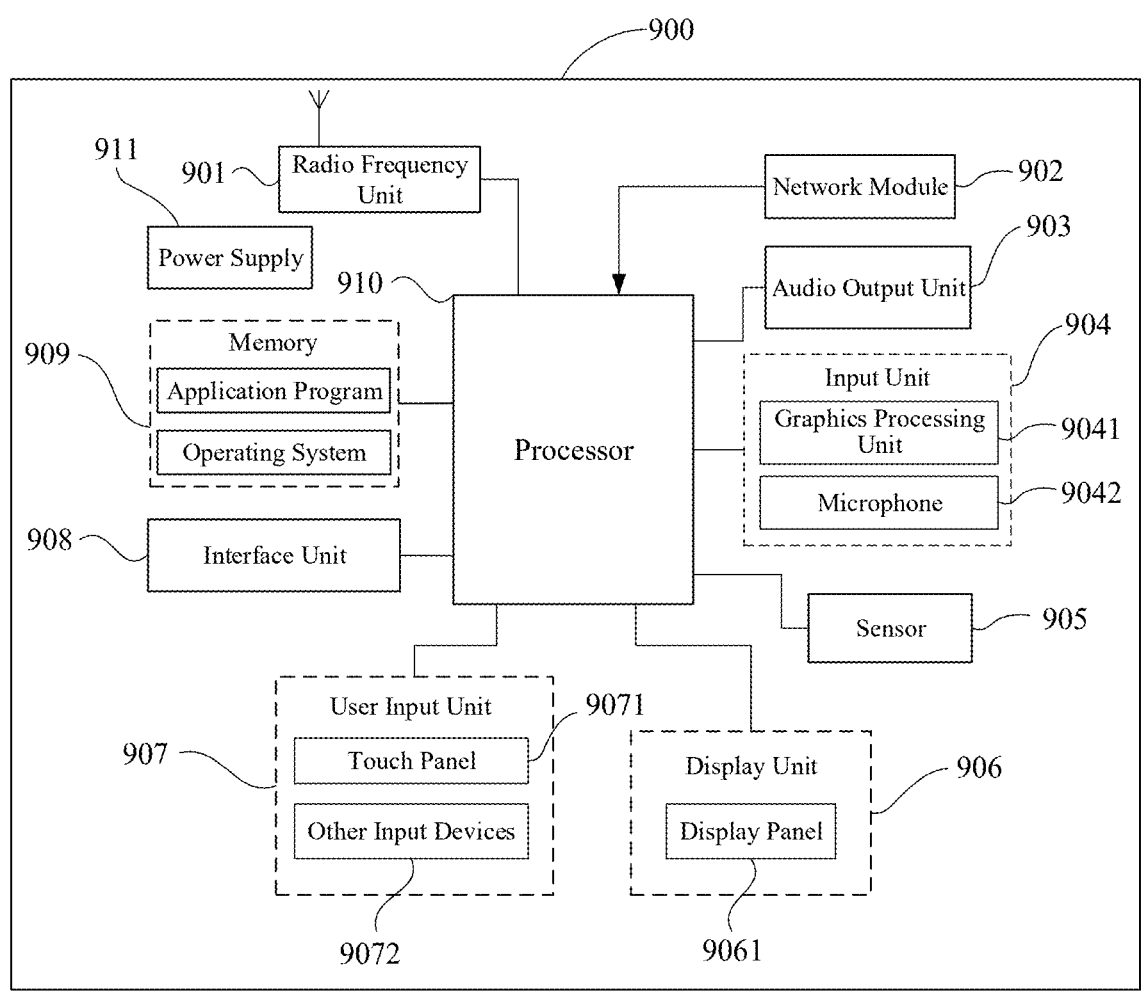
FIG. 9 is a block diagram of a hardware structure of an electronic device provided in various embodiments of the present disclosure.

FIG. 9 is a schematic diagram of a hardware structure of an electronic device for implementing various embodiments of the present disclosure.

The electronic device 900 includes but is not limited to a radio frequency unit 901, a network module 902, an audio output unit 903, an input unit 904, a sensor 905, a display unit 906, a user input unit 907, an interface unit 908, a memory 909, a processor 910 and a power supply 911. It can be understood by a person skilled in the art that the structure of the electronic device involved in the embodiment of the present disclosure does not constitute a limitation on the electronic device, and the electronic device can include more or less components than shown in the drawings, or combine some components, or arrange different components. In the embodiments of the present disclosure, the electronic device includes but is not limited to a mobile phone, a tablet computer, a notebook computer, a palmtop computer, a vehicle-mounted terminal, a wearable device, a pedometer, or the like.

It should be understood that in the embodiment of the present disclosure, the radio frequency unit 901 may be configured to receive and transmit information, or to receive and transmit a signal in a call process, and specially, after receiving downlink data from a base station, transmit the downlink data to the processor 910 for processing; and also transmit uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The electronic device provides wireless broadband Internet access for a user by using the network module 902, for example, helping the user send and receive e-mails, browse web pages, and access streaming media.

The audio output unit 903 may convert audio data received by the radio frequency unit 901 or the network module 902 or stored in the memory 909 into an audio signal and output the audio signal as a sound. In addition, the audio output unit 903 may further provide audio output (for example, a call signal received sound or a message received sound) related to a specific function performed by the electronic device 900. The audio output unit 903 includes a speaker, a buzzer, a telephone receiver, and the like.

The input unit 904 is configured to receive audio or video signals. The input unit 904 may include a graphics processing unit (GPU) 9041 and a microphone 9042. The graphics processing unit 9041 processes image data of a static picture or a video obtained by an image capture apparatus (for example, a camera) in a video capture mode or an image capture mode. A processed image frame may be displayed on the display unit 906. The image frame processed by the graphics processing unit 9041 may be stored in the memory 909 (or another storage medium) or transmitted via the radio frequency unit 901 or the network module 902. The microphone 9042 is capable of receiving sounds and processing such sounds into audio data. The processed audio data can be converted, in a telephone call mode, into a format that can be transmitted via the radio frequency unit 901 to a mobile communication base station.

The electronic device 900 further includes at least one sensor 905, for example, an optical sensor, a motion sensor, and other sensors. In some embodiments, the optical sensor includes an ambient light sensor and a proximity sensor. The ambient light sensor may adjust brightness of a display panel 9061 based on intensity of ambient light, and the proximity sensor may turn off the display panel 9061 and/or backlight when the electronic device 900 moves close to an ear. As a type of motion sensor, an accelerometer sensor can detect magnitudes of accelerations in all directions (usually three axes), can detect a magnitude and a direction of gravity when in a static state, and can be applied to posture recognition (for example, screen switching between portrait and landscape, related games, and magnetometer posture calibration) of the electronic device, functions related to vibration recognition (for example, a pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 may include the display panel 9061. The display panel 9061 may be configured in a form of a liquid crystal display (LCD), an organic light-emitting diode (OLED), or the like.

The user input unit 907 may be configured to: receive input digit or character information and generate key signal input related to user settings and function control of the electronic device. In some embodiments, the user input unit 907 includes a touch panel 9071 and other input devices 9072. The touch panel 9071 is also referred to as a touchscreen, and may collect a touch operation of the user on or near the touch panel (for example, an operation performed on or near the touch panel 9071 by the user by using any appropriate object or accessory such as a finger or a stylus). The touch panel 9071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, transmits the touchpoint coordinates to the processor 910, and can receive a command transmitted by the processor 910 and execute the command. In addition, the touch panel 9071 may be implemented in a plurality of forms, for example, as a resistive, a capacitive, an infrared, or a surface acoustic wave touch panel. The user input unit 907 may further include other input devices 9072 in addition to the touch panel 9071. In some embodiments, the other input devices 9072 may include but are not limited to a physical keyboard, a function button (for example, a volume button or a power on/off button), a trackball, a mouse, and a joystick. Details are not described herein.

Further, the touch panel 9071 may cover the display panel 9061. When detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. It can be understood that in one embodiment, the touch panel 9071 and the display panel 9061 serve as two separate components to implement input and output functions of the electronic device. However, in some embodiments, the touch panel 9071 and the display panel 9061 may be integrated to implement the input and output functions of the electronic device, and this is not limited herein.

The interface unit 908 is an interface for connecting an external apparatus to the electronic device 900. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 908 may be configured to receive an input (for example, data information or power) from an external apparatus and transmit the received input to one or more elements in the electronic device 900, or may be configured to transmit data between the electronic device 900 and the external apparatus.

The memory 909 may be configured to store software programs and various data. The memory 909 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 909 may include a high-speed random access memory, or may further include a non-volatile memory, for example, at least one magnetic disk storage device, flash memory, or other volatile solid-state storage devices.

The processor 910 is a control center of the electronic device, uses various interfaces and lines to connect all parts of the entire electronic device, and performs various functions and data processing of the electronic device by running or executing the software program and/or module stored in the memory 909 and invoking data stored in the memory 909, thereby performing overall monitoring on the electronic device. The processor 910 may include one or more processing units. In some embodiments of the present disclosure, the processor 910 may integrate an application processor and a modem processor. The application processor mainly processes the operating system, a user interface, an application program, and the like. The modem processor mainly processes wireless communication. In some embodiments, it can be understood that the modem processor may be not integrated in the processor 910.

The electronic device 900 may further include a power supply 911 (for example, a battery) supplying power to the components. In some embodiments of the present disclosure, the power supply 911 may be logically connected to the processor 910 through a power management system, so that functions such as charge management, discharge management, and power consumption management are implemented by using the power management system.

In addition, the electronic device 900 includes some functional modules that are not shown. Details are not described herein.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of the present disclosure is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions of the foregoing embodiments, a person skilled in the art can clearly understand that the method in the foregoing embodiments may be implemented by software in combination with a necessary general hardware platform. In some embodiments, the method in the foregoing embodiments may be implemented by hardware. However, in many situations, the former is an example implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The foregoing describes the embodiments of the present disclosure with reference to the accompanying drawings. However, the present disclosure is not limited to the foregoing specific embodiments. The foregoing specific embodiments are merely illustrative rather than restrictive. As instructed by the present disclosure, a person of ordinary skill in the art may develop many other manners without departing from principles of the present disclosure and the protection scope of the claims, and all such manners fall within the protection scope of the present disclosure.

A person of ordinary skill in the art may be aware that the various exemplary units and algorithm steps described in conjunction with the embodiments disclosed in the embodiments of the present disclosure can be implemented by electronic hardware, or a combination of computer software and electronic hardware. Whether the functions are executed by hardware or software depends on particular applications and design constraint conditions of the technical solutions. A person skilled in the art can use different methods to implement the described functions for every particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present disclosure, it should be understood that the disclosed apparatus and method may be implemented in other manners. For example, the described apparatus embodiment is merely an example. For example, division into the units is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one position, or may be distributed on a plurality of network units. Some or all of the units may be selected based on actual requirements to achieve the objectives of the solutions of embodiments.

In addition, functional units in embodiments of the present disclosure may be integrated into one unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a computer software product. The computer software product is stored in a storage medium, and includes several instructions for instructing a computer device (which may be a personal computer, a server, a network device, or the like) to perform all or some of the steps of the method described in embodiments of the present disclosure. The storage medium may include but is not limited to any medium that can store program code, for example, a USB flash disk, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for determining a master-slave node, applied to a multi-node server, wherein the multi-node server comprises a plurality of storage nodes, and the method comprises:
   determining a first target node, a second target node, a third target node and a fourth target node from the plurality of storage nodes, wherein the first target node comprises first check data, which comprises a first first character and a first last character;
   generating a first heartbeat signal and a first master-disable signal for the first target node;
   generating a second heartbeat signal and a second master-disable signal for the second target node;
   generating a third heartbeat signal and a third master-disable signal for the third target node;
   generating a fourth heartbeat signal and a fourth master-disable signal for the fourth target node; and
   determining the first target node as a master node in response to the first first character and the first last character being the same and the first first character and the first last character being the same as a preset value, determining that there is no master node in the second target node, the third target node and the fourth target node based on the second heartbeat signal, the second master-disable signal, the third heartbeat signal, the third master-disable signal, the fourth heartbeat signal and the fourth master-disable signal, the first target node being not a slave node, the first master-disable signal being invalid, and the first heartbeat signal being in a normal state.

2. The method according to claim 1, further comprising:
   determining the first target node as the master node in response to the first target node being the slave node, the first heartbeat signal being in the normal state, the first master-disable signal being invalid, the second master-disable signal being invalid, and the third master-disable signal being invalid;
   determining the first target node as the slave node in response to the first target node being the slave node, the first heartbeat signal being in an abnormal state, and/or the first master-disable signal being valid, and/or the second master-disable signal being valid, and/or the third master-disable signal being valid;
   determining the first target node as the slave node in response to the first target node being not the slave node, the first heartbeat signal being in the abnormal state, and/or the first master-disable signal being valid; and
   determining the first target node as the slave node in response to the first first character and the first last character being different, and/or the first first character and the first last character being different from the preset value.

3. The method according to claim 1, further comprising:
   determining whether there is a master node in the first target node, the third target node and the fourth target node based on the first heartbeat signal, the first master-disable signal, the third heartbeat signal, the third master-disable signal, the fourth heartbeat signal and the fourth master-disable signal in response to the first first character and the first last character being the same, and the first first character and the first last character being the same as the preset value;
   determining the second target node as a master node in response to determining that there is no master node in the first target node, the third target node and the fourth target node, the second target node being not a slave node, the second heartbeat signal being in the normal state, and the second master-disable signal being invalid; and
   determining the second target node as the master node in response to determining that there is no master node in the first target node, the third target node and the fourth target node, the second target node being the slave node, the second heartbeat signal being in the normal state, the second master-disable signal being invalid, the third master-disable signal being invalid, and the first heartbeat signal being in an abnormal state or the first master-disable signal being valid.

4. The method according to claim 3, further comprising:
   determining the second target node as the slave node in response to determining that there is the master node in the first target node, the third target node and the fourth target node;
   determining the second target node as the slave node in response to determining that there is no master node in the first target node, the third target node and the fourth target node, the second target node being the slave node, the second heartbeat signal being in the abnormal state, and/or the second master-disable signal being valid, and/or the third master-disable signal being valid, and/or the first heartbeat signal being in the normal state, and/or the first master-disable signal being invalid; and
   determining the second target node as the slave node in response to determining that there is no master node in the first target node, the third target node and the fourth target node, the second target node being not the slave node, the second heartbeat signal being in the abnormal state, and/or the second master-disable signal being valid.

5. The method according to claim 3, wherein the second target node comprises second check data, which comprises a second first character and a second last character, and the method further comprises:
   determining whether there is a master node in the third target node and the fourth target node based on the third heartbeat signal, the third master-disable signal, the fourth heartbeat signal and the fourth master-disable signal in response to the first first character and the first last character being different and/or the first first character and the first last character being different from the preset value, and the second first character and the second last character being the same and the second first character and the second last character being the same as the preset value;
   determining the second target node as the master node in response to determining that there is no master node in the third target node and the fourth target node, the second target node being not the slave node, the second heartbeat signal being in the normal state and the second master-disable signal being invalid; and
   determining the second target node as the master node in response to determining that there is no master node in the third target node and the fourth target node, the second target node being the slave node, the second heartbeat signal being in the normal state, the second master-disable signal being invalid and the third master-disable signal being invalid.

6. The method according to claim 5, further comprising:
determining the second target node as the slave node in response to the first first character and the first last character being different and/or the first first character and the first last character being different from the preset value, and the second first character and the second last character being different and/or the second first character and the second last character being different from the preset value; and
determining the second target node as the slave node in response to the first first character and the first last character being different and/or the first first character and the first last character being different from the preset value, the second first character and the second last character being the same and the second first character and the second last character being the same as the preset value, and determining that there is the master node in the third target node and the fourth target node.

7. The method according to claim 6, further comprising:
determining the second target node as the slave node in response to the second target node being not the slave node, the second heartbeat signal being in the abnormal state, and/or the second master-disable signal being valid; and
determining the second target node as the slave node in response to the second target node being the slave node, the second heartbeat signal being in the abnormal state, and/or the second master-disable signal being valid, and/or the third master-disable signal being valid.

8. The method according to claim 5, further comprising:
determining whether there is a master node in the first target node, the second target node and the fourth target node based on the first heartbeat signal, the first master-disable signal, the second heartbeat signal, the second master-disable signal, the fourth heartbeat signal and the fourth master-disable signal in response to the first first character and the first last character being the same and the first first character and the first last character being the same as the preset value, or the second first character and the second last character being the same and the second first character and the second last character being the same as the preset value;
determining the third target node as a master node in response to determining that there is no master node in the first target node, the second target node and the fourth target node, the third target node being not a slave node, the third heartbeat signal being in the normal state, and the third master-disable signal being invalid;
determining the third target node as the master node in response to determining that there is no master node in the first target node, the second target node and the fourth target node, the third target node being the slave node, the second master-disable signal being valid, the third heartbeat signal being in the normal state, and the third master-disable signal being invalid; and
determining the third target node as the master node in response to determining that there is no master node in the first target node, the second target node and the fourth target node, the third target node being the slave node, the second master-disable signal being invalid, the third heartbeat signal being in the normal state, the third master-disable signal being invalid, the first heartbeat signal being in the abnormal state or the first master-disable signal being valid, and the second heartbeat signal being in the abnormal state.

9. The method according to claim 8, further comprising:
determining the third target node as the slave node in response to determining that there is the master node in the first target node, the second target node and the fourth target node;
determining the third target node as the slave node in response to determining that there is no master node in the first target node, the second target node and the fourth target node, the third target node being not the slave node, the third heartbeat signal being in the abnormal state, and/or the third master-disable signal being valid;
determining the third target node as the slave node in response to determining that there is no master node in the first target node, the second target node and the fourth target node, the third target node being the slave node, the second master-disable signal being valid, the third heartbeat signal being in the abnormal state, and/or the third master-disable signal being valid; and
determining the third target node as the slave node in response to determining that there is no master node in the first target node, the second target node and the fourth target node, the third target node being the slave node, the second master-disable signal being invalid, the third heartbeat signal being in the abnormal state, and/or the third master-disable signal being valid, and/or the first heartbeat signal being in the normal state, and/or the first master-disable signal being invalid, and/or the second heartbeat signal being in the normal state.

10. The method according to claim 8, wherein the third target node comprises third check data, which comprises a third first character and a third last character, and the method further comprises:
determining whether the fourth target node is a master node based on the fourth heartbeat signal and the fourth master-disable signal in response to the first first character and the first last character being different and/or the first first character and the first last character being different from the preset value, the second first character and the second last character being different and/or the second first character and the second last character being different from the preset value, and the third first character and the third last character being the same and the third first character and the third last character being the same as the preset value; and
determining the third target node as the master node in response to determining that the fourth target node is not the master node, the third heartbeat signal is in the normal state, and the third master-disable signal is invalid.

11. The method according to claim 10, further comprising:
determining the third target node as the slave node in response to the first first character and the first last character being different and/or the first first character and the first last character being different from the preset value, the second first character and the second last character being different and/or the second first character and the second last character being different from the preset value, and the third first character and the third last character being different and/or the third first character and the third last character being different from the preset value;

determining the third target node as the slave node in response to the first first character and the first last character being different and/or the first first character and the first last character being different from the preset value, the second first character and the second last character being different and/or the second first character and the second last character being different from the preset value, the third first character and the third last character being the same and the third first character and the third last character being the same as the preset value, and determining that the fourth target node is the master node; and determining the third target node as the slave node in response to the first first character and the first last character being different and/or the first first character and the first last character being different from the preset value, the second first character and the second last character being different and/or the second first character and the second last character being different from the preset value, the third first character and the third last character being the same and the third first character and the third last character being the same as the preset value, determining that the fourth target node is not the master node, and the third heartbeat signal being in the abnormal state and/or the third master-disable signal being valid.

12. The method according to claim 10, further comprising:

determining whether any of the first target node, the second target node and the third target node is a master node based on the first heartbeat signal, the first master-disable signal, the second heartbeat signal, the second master-disable signal, the third heartbeat signal and the third master-disable signal in response to the first first character and the first last character being the same and the first first character and the first last character being the same as the preset value, or the second first character and the second last character being the same and the second first character and the second last character being the same as the preset value, or the third first character and the third last character being the same and the third first character and the third last character being the same as the preset value;

determining the fourth target node as the master node in response to determining that there is no master node in the first target node, the second target node and the third target node, the fourth target node being not the slave node, the fourth heartbeat signal being in the normal state, and the fourth master-disable signal being invalid;

determining the fourth target node as the master node in response to determining that there is no master node in the first target node, the second target node and the third target node, the fourth target node being the slave node, the second master-disable signal being valid, the fourth heartbeat signal being in the normal state, the fourth master-disable signal being invalid, and the third heartbeat signal being in the abnormal state or the third master-disable signal being valid;

determining the fourth target node as the master node in response to determining that there is no master node in the first target node, the second target node and the third target node, the fourth target node being the slave node, the second master-disable signal being invalid, the third master-disable signal being valid, the fourth heartbeat signal being in the normal state, and the fourth master-disable signal being invalid; and determining the fourth target node as the master node in response to determining that there is no master node in the first target node, the second target node and the third target node, the fourth target node being the slave node, the second master-disable signal being invalid, the third master-disable signal being invalid, the first heartbeat signal being in the abnormal state or the first master-disable signal being valid, the second heartbeat signal being in the abnormal state, and the third heartbeat signal being in the abnormal state.

13. The method according to claim 12, further comprising:

determining the fourth target node as a slave node in response to determining that there is no master node in the first target node, the second target node and the third target node, the fourth target node being not the slave node, and the fourth heartbeat signal being in the abnormal state, and/or the fourth master-disable signal being invalid;

determining the fourth target node as the slave node in response to determining that there is no master node in the first target node, the second target node and the third target node, the fourth target node being the slave node, the second master-disable signal being valid, the fourth heartbeat signal being in the abnormal state, and/or the fourth master-disable signal being valid, the third heartbeat signal being in the abnormal state, and/or the third master-disable signal being valid;

determining the fourth target node as the slave node in response to determining that there is no master node in the first target node, the second target node and the third target node, the fourth target node being the slave node, the second master-disable signal being invalid, the third master-disable signal being valid, the fourth heartbeat signal being in the abnormal state, and/or the fourth master-disable signal being valid;

determining the fourth target node as the slave node in response to determining that there is no master node in the first target node, the second target node and the third target node, the fourth target node being the slave node, the second master-disable signal being invalid, the third master-disable signal being invalid, the first heartbeat signal being in the normal state, and/or the first master-disable signal being invalid, and/or the second heartbeat signal being in the normal state, and/or the third heartbeat signal being in the normal state; and determining the fourth target node as the slave node in response to determining that there is the master node in the first target node, the second target node and the third target node.

14. The method according to claim 12, wherein the fourth target node comprises fourth check data, which comprises a fourth first character and a fourth last character, and the method further comprises:

determining the fourth target node as the master node in response to the first first character and the first last character being different and/or the first first character and the first last character being different from the preset value, the second first character and the second last character being different and/or the second first character and the second last character being different from the preset value, the third first character and the third last character being different and/or the third first character and the third last character being different from the preset value, the fourth first character and the fourth last character being the same and the fourth first character and the fourth last character being the same as the preset value, the fourth heartbeat signal being in the normal state, and the fourth master-disable signal being invalid.

15. The method according to claim 14, further comprising:
determining the fourth target node as the slave node in response to the fourth first character and the fourth last character being different, and/or the fourth first character and the fourth last character being different from the preset value; and
determining the fourth target node as the slave node in response to the fourth first character and the fourth last character being the same and the fourth first character and the fourth last character being the same as the preset value, the fourth heartbeat signal being in the abnormal state, and/or the fourth master signal being valid.

16. The method according to claim 1, wherein the first target node, the second target node, the third target node and the fourth target node respectively have corresponding baseboard management controllers (BMCs), which are configured to generate the first heartbeat signal and the first master-disable signal for the first target node, the second heartbeat signal and the second master-disable signal for the second target node, the third heartbeat signal and the third master-disable signal for the third target node, and the fourth heartbeat signal and the fourth master-disable signal for the fourth target node.

17. The method according to claim 1, wherein the multi-node server comprises a complex programmable logic device (CPLD), which is configured to determine the first target node, the second target node, the third target node and the fourth target node as master nodes or slave nodes.

18. An electronic device, comprising a processor, a communication interface, a memory and a communication bus, wherein the processor, the communication interface and the memory communicate with each other via the communication bus;
the memory is configured to store a computer program; and
the processor is configured to, when executing the computer program stored on the memory, implement operations comprising:
determining a first target node, a second target node, a third target node and a fourth target node from the plurality of storage nodes, wherein the first target node comprises first check data, which comprises a first first character and a first last character;
generating a first heartbeat signal and a first master-disable signal for the first target node;
generating a second heartbeat signal and a second master-disable signal for the second target node;
generating a third heartbeat signal and a third master-disable signal for the third target node;
generating a fourth heartbeat signal and a fourth master-disable signal for the fourth target node; and
determining the first target node as a master node in response to the first first character and the first last character being the same and the first first character and the first last character being the same as a preset value, determining that there is no master node in the second target node, the third target node and the fourth target node based on the second heartbeat signal, the second master-disable signal, the third heartbeat signal, the third master-disable signal, the fourth heartbeat signal and the fourth master-disable signal, the first target node being not a slave node, the first master-disable signal being invalid, and the first heartbeat signal being in a normal state.

19. The electronic device according to claim 18, wherein the processor is further configured to implement operations comprising:
determining the first target node as the master node in response to the first target node being the slave node, the first heartbeat signal being in the normal state, the first master-disable signal being invalid, the second master-disable signal being invalid, and the third master-disable signal being invalid;
determining the first target node as the slave node in response to the first target node being the slave node, the first heartbeat signal being in an abnormal state, and/or the first master-disable signal being valid, and/or the second master-disable signal being valid, and/or the third master-disable signal being valid;
determining the first target node as the slave node in response to the first target node being not the slave node, the first heartbeat signal being in the abnormal state, and/or the first master-disable signal being valid; and
determining the first target node as the slave node in response to the first first character and the first last character being different, and/or the first first character and the first last character being different from the preset value.

20. A non-transitory computer readable storage medium having stored thereon instructions which, when executed by one or more processors, cause the processors to perform operations comprising:
determining a first target node, a second target node, a third target node and a fourth target node from the plurality of storage nodes, wherein the first target node comprises first check data, which comprises a first first character and a first last character;
generating a first heartbeat signal and a first master-disable signal for the first target node;
generating a second heartbeat signal and a second master-disable signal for the second target node;
generating a third heartbeat signal and a third master-disable signal for the third target node;
generating a fourth heartbeat signal and a fourth master-disable signal for the fourth target node; and
determining the first target node as a master node in response to the first first character and the first last character being the same and the first first character and the first last character being the same as a preset value, determining that there is no master node in the second target node, the third target node and the fourth target node based on the second heartbeat signal, the second master-disable signal, the third heartbeat signal, the third master-disable signal, the fourth heartbeat signal and the fourth master-disable signal, the first target node being not a slave node, the first master-disable signal being invalid, and the first heartbeat signal being in a normal state.

* * * * *